United States Patent [19]
Kerr

[11] 3,919,895
[45] Nov. 18, 1975

[54] VARIABLE OUTPUT TRANSMISSION

[75] Inventor: John Hugh Kerr, Kitchener, Canada

[73] Assignee: Ker-Train Systems N.V., Curacao, Netherlands Antilles

[22] Filed: Sept. 11, 1974

[21] Appl. No.: 505,110

[30] Foreign Application Priority Data
Sept. 26, 1973 Canada .............................. 182000

[52] U.S. Cl. .................................... 74/394; 74/801
[51] Int. Cl.² ..................... F16H 35/02; F16H 1/28
[58] Field of Search ............................. 74/394, 802

[56] References Cited
UNITED STATES PATENTS

| | | | |
|---|---|---|---|
| 841,444 | 1/1907 | Richards | 74/394 |
| 2,378,967 | 6/1945 | Andrew | 74/394 X |
| 3,204,330 | 9/1965 | Pompernacki | 74/394 X |
| 3,656,363 | 4/1972 | DeFontenay | 74/394 |

FOREIGN PATENTS OR APPLICATIONS

| | | | |
|---|---|---|---|
| 1,129,029 | 5/1962 | Germany | 74/394 |

*Primary Examiner*—Leonard H. Gerin

[57] ABSTRACT

Infinitely-variable transmissions have been disclosed that consist of a plurality of inverted-gear-train-loops that share common first and last gear elements with each individual loop incorporating a square-wave-generator, with the first and last common elements of the loops being respectively either the variable-ratio-driver-gears of the generators, or the driven-take-off-gear of the loops, with the differential-assemblies of the generators mounted in a stationary-housing with their axies parallel to and evenly spaced around the common axis to the transmission. Accordingly, the reactive force of the conservative force field of the transmission is on the stationary housing, with either the common driven-take-off-gear or the common variable-ratio-driver-gears used reciprocally, as either the input or the output element of the transmission.

In this disclosure, the differential assemblies of the inverted-gear-train-loops are mounted in a rotatable-center-spool that is attached to the prime mover. Accordingly, the center-spool is the input element of the transmission, with either the common driven-take-off-gear or the common variable-ratio-driver-gears used reciprocally, as either the output or the reactive element of the transmission.

19 Claims, 33 Drawing Figures

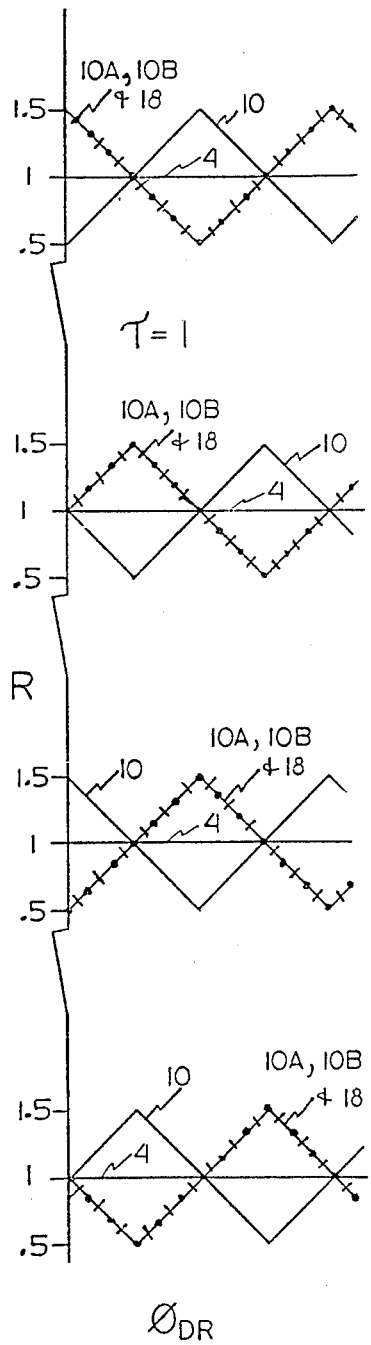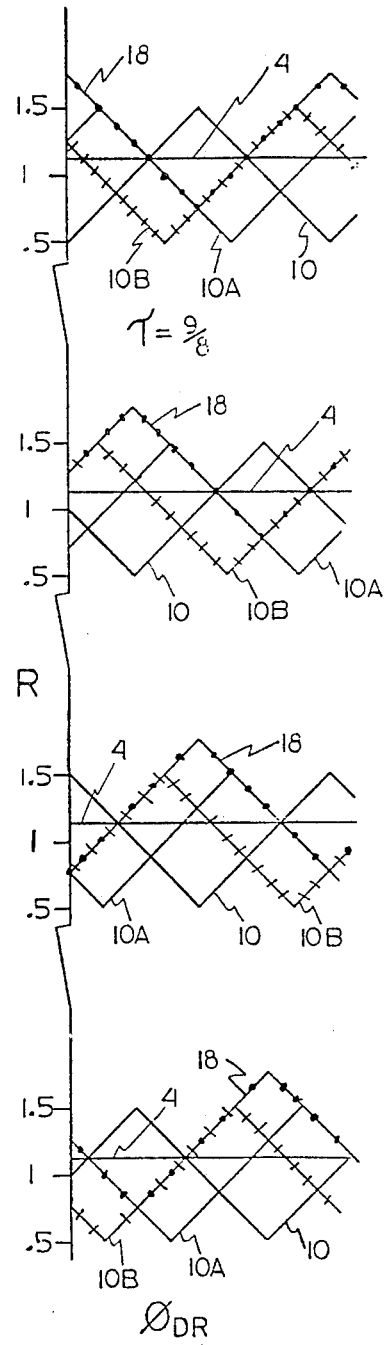

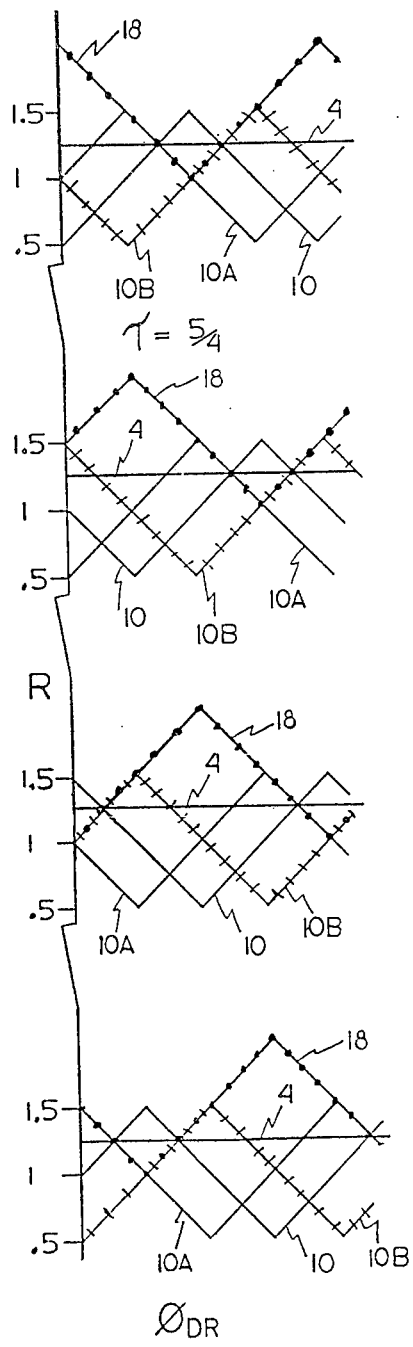

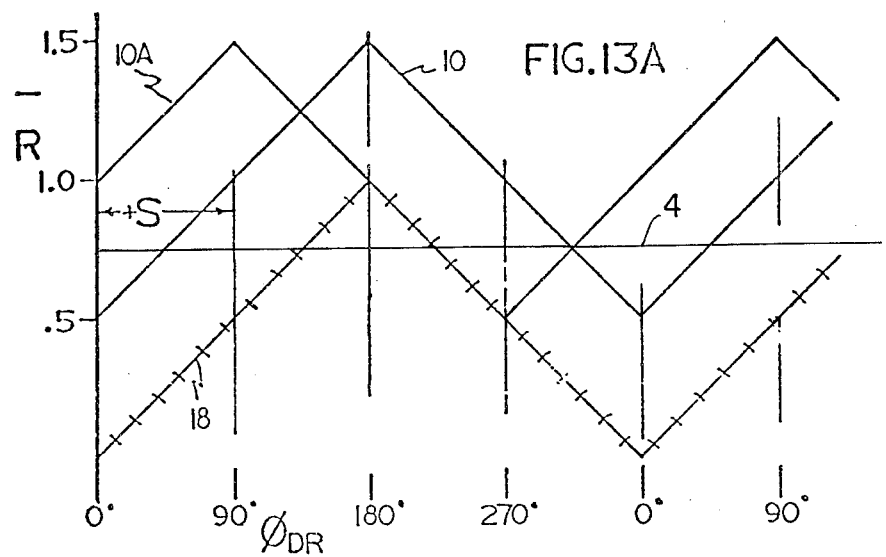
FIG.13A
FIG.18
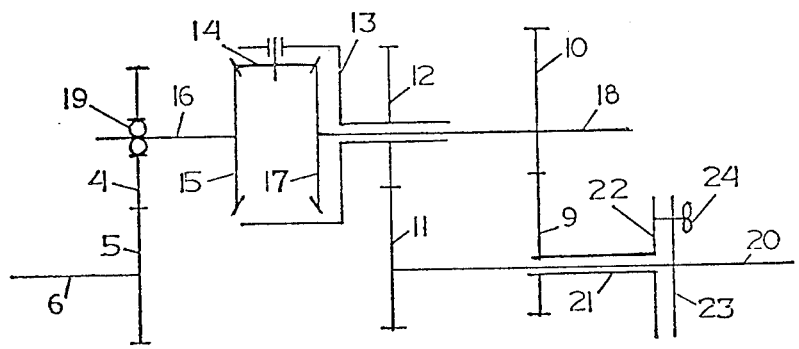
FIG.19
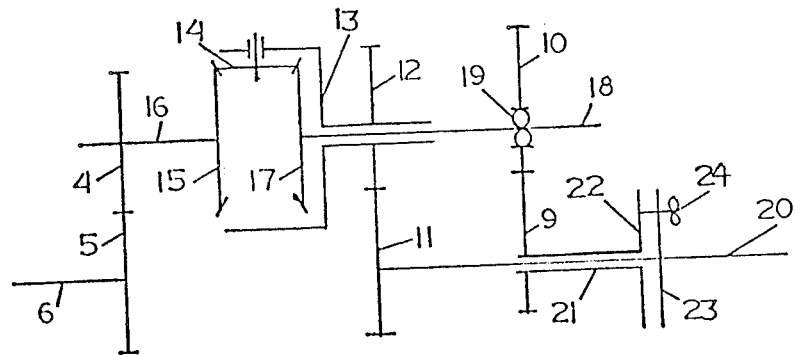

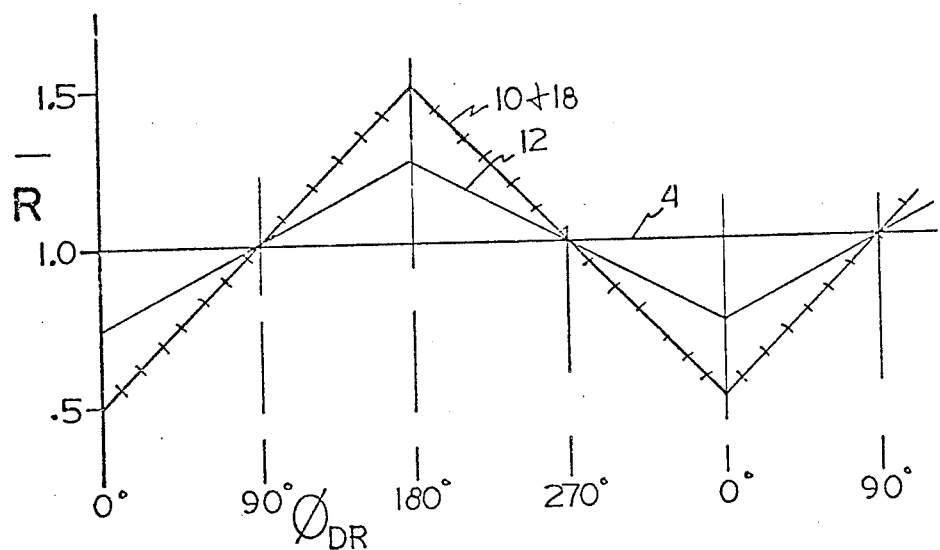
FIG. 22
FIG. 23
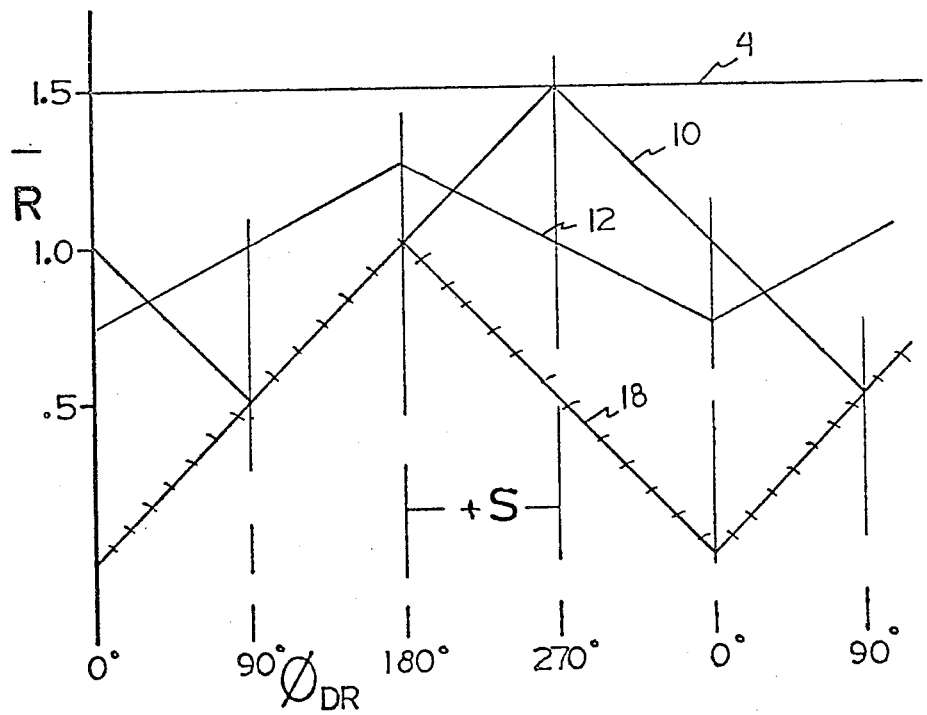

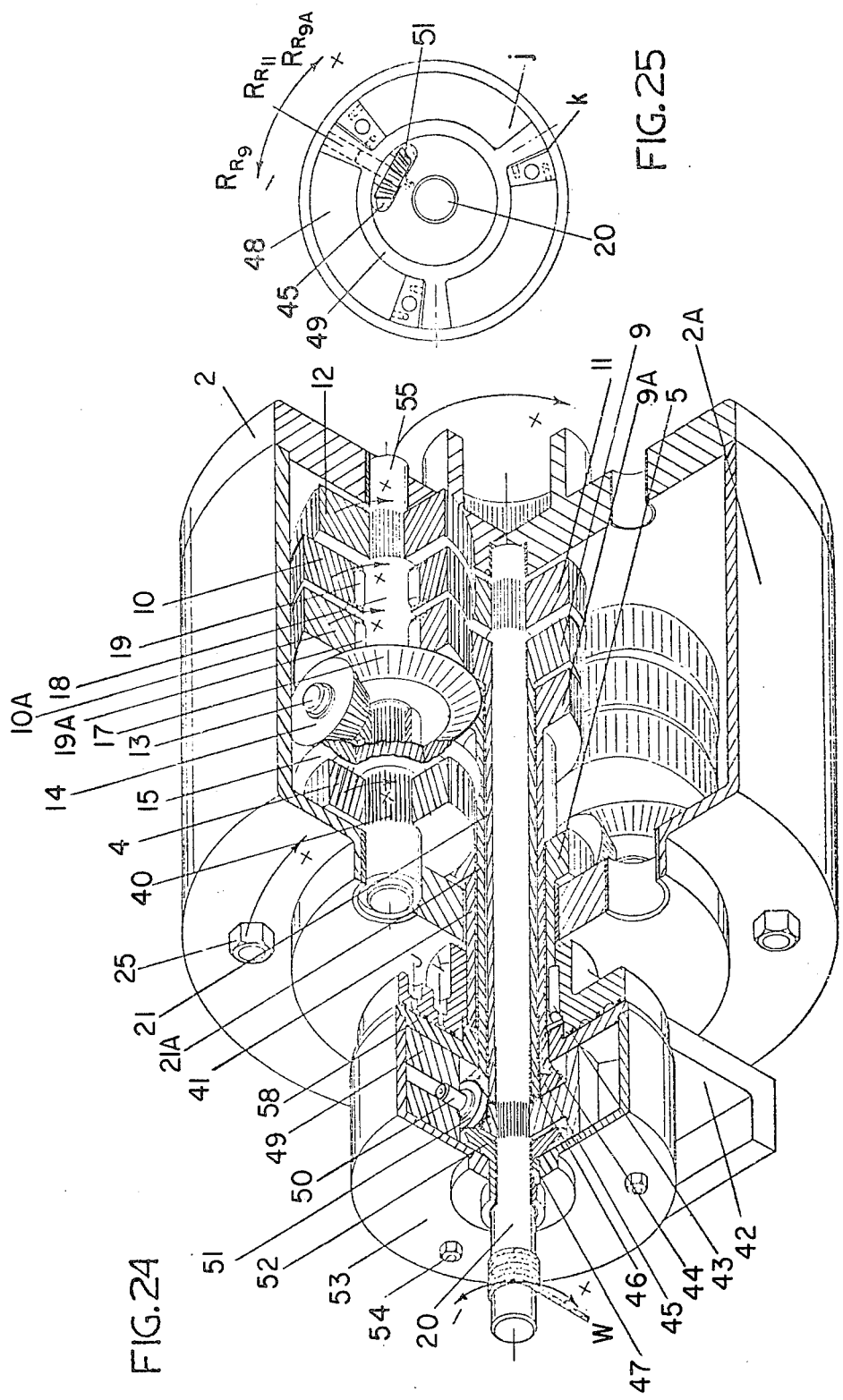

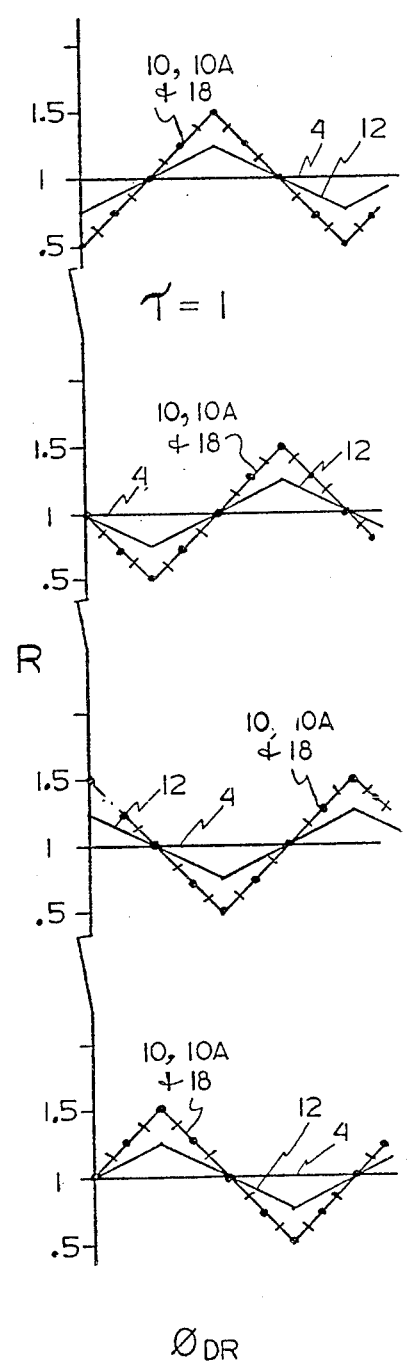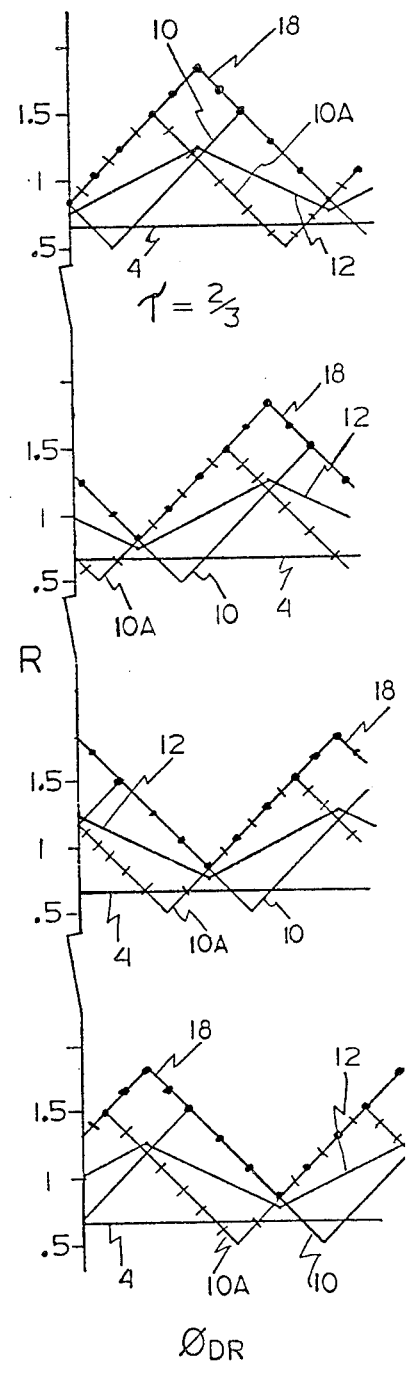

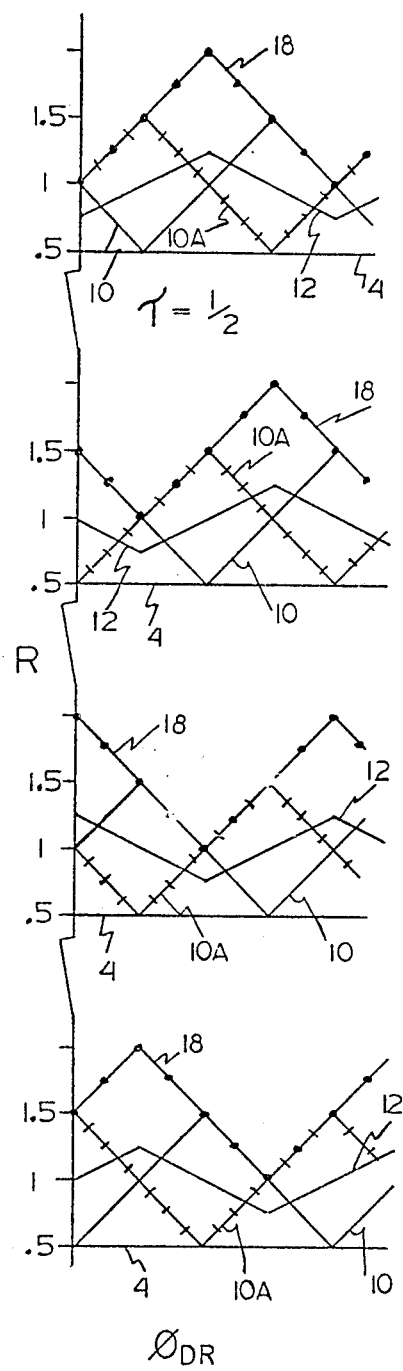

VARIABLE OUTPUT TRANSMISSION

The present invention is related to infinitely-variable transmissions that consist of a plurality of inverted-gear-train-loops that share common first and last gear-elements, with each individual loop incorporating a mechanical-square-wave-generator. The principle of the mechanical-square-wave-generator can be stated as the realization that the linear-sawtooth-velocity-patterns of two constantly-rotating variable-ratio-driven-gears can be added together by a differential-gear-train to produce a square-wave output on the constrained third element of the differential-gear-train, with the magnitutde and duration of the resulting periods of constant-velocity-ratio dependent on the phase-angle between the linear-sawtooth-velocity-patterns of the two driven-variable-ratio-gears. More specifically, the present invention is related to my co-pending Canadian applications, Ser. No. 150-163, filed Aug. 31, 1972, titled "Variable Output Transmission"; and Ser. No. 164-296, filed Feb. 21, 1973, titled "Variable Output Transmission" and subsequently refiled Ser. No. 192-761 on Feb. 18, 1974.

The specific technology claimed by this invention pertains to the kinematics of transmissions that incorporate square-wave-generators in a plurality of inverted-gear-train-loops that share a common first and last gear-element, with the differential-assemblies of the generators mounted on a rotatable-center-spool to which is attached a prime-mover, with either the common driven-take-off-gear of the loop, or the common variable-ratio-driver-gears of the generators, used reciprocally as either the output or the reactive elements of the transmission.

It is the object of this invention to disclose the kinematic layout of center-spool-transmissions that incorporate the square-wave-generators (disclosed in my referenced co-pending Canadian patent application Ser. No. 150-683) to alter the ratio of kinematic continuum through the transmission.

A second object of this invention is to disclose the kinematic layout of center-spool-transmissions that incorporate the square-wave generators (disclosed in my referenced co-pending Canadian patent application Ser. No. 164-286, and subsequently refiled Ser. No. 192-761) to alter the ratio of kinematic-continuum through the transmission.

In its broadest aspects the present invention contemplates an infinitely variable transmission which has co-axial input and output shafts. Mounted on the input shaft are at least two relatively rotatable variable profile driver gears, the relative rotational positioning of which can be controlled by control means. The output shaft has at least one constant profile driven take-off gear mounted thereon. A center spool is fixed to the input shaft and a plurality of inverted gear loops are arranged about the axis of the input and output shafts. Each loop includes a square wave generator which has relatively rotatable variable profile driven gears meshing with the driver gears, a differential assembly mounted in the center spool and a constant profile driver take-off gear meshing with the driven take-off gear. The rotation of the driver take-off gear is controlled by the differential assembly through an overrunning clutch. For a given input, and subject to the relative rotational positioning of the variable profile driver gears and a fixed ratio of the take-off gears, the output shaft can be made to rotate in either direction, either with or without infinite translation or it can be made to rotate in both directions with infinite translation.

Other features and characteristics of this invention will be apparent from the following detailed description and explanation, taken in conjunction with the accompanying drawings, in which:

FIGS. 12, 13, 13A show the kinematics of FIG. 9;

FIGS. 15 to 17 show the kinematics of the loops of FIG. 14;

FIG. 18 shows a simple bevel-carrier inverted-gear-train-loop;

FIG. 19 shows the loop FIG. 18 with overrunning-clutch repositioned;

FIGS. 22 and 23 show the kinematics of the loop FIG. 19;

FIGS. 24 and 25 show in isometric view of a variable-ratio-driver-gear output-transmission;

FIGS. 26 to 28 show the kinematics of the loops FIG. 24;

Figure 1:
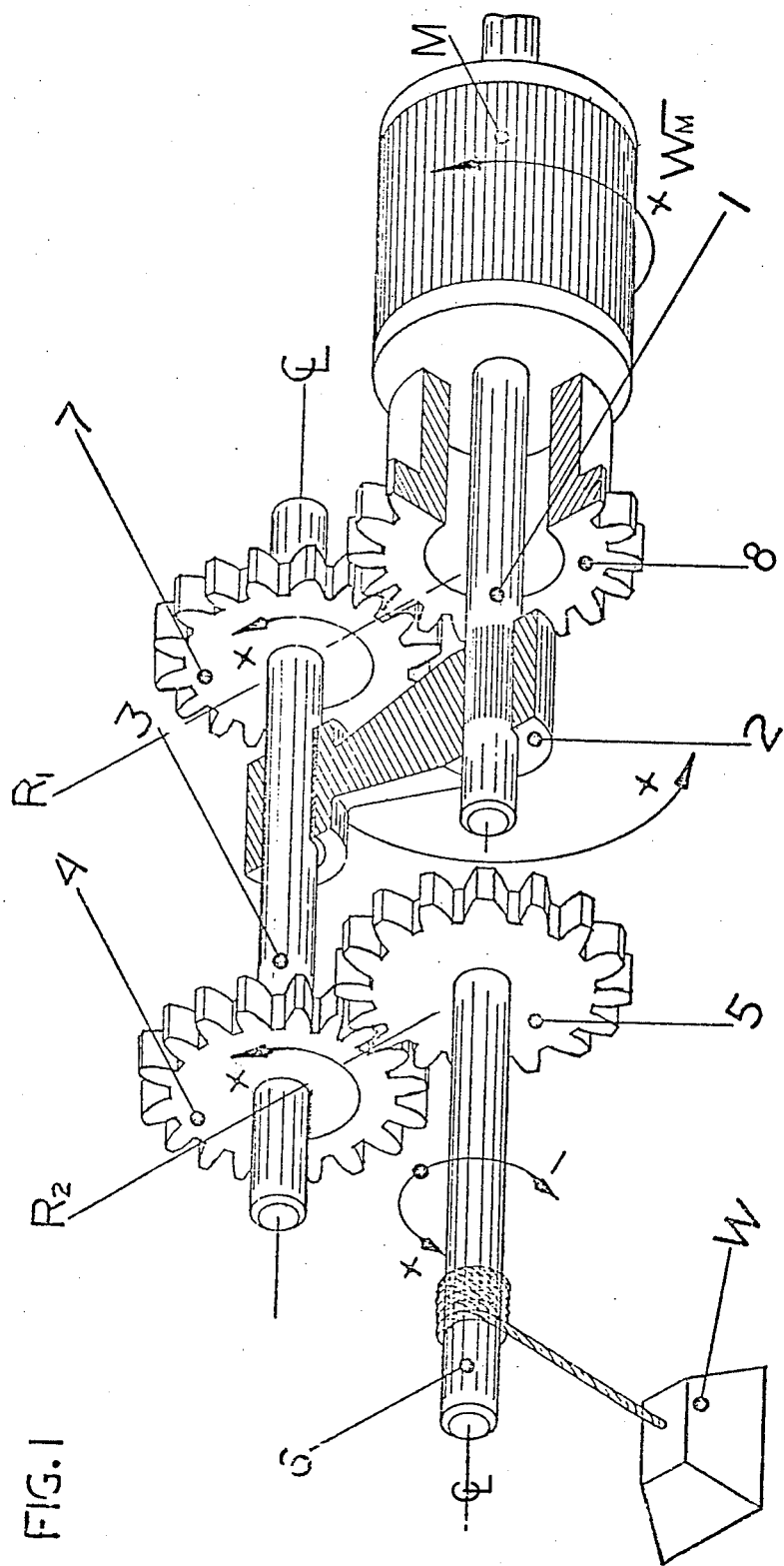
FIG. 1 shows the basic kinematic model of the transmission.

FIG. 1 is an isometric portrayal of a single loop that shows the principal kinematic elements of a center-spool-transmission. Item 1 and 6 are respectively the input and output shafts to the transmission, co-axially mounted on the same center-line as shown. Affixed to the input is a prime-mover M, with rotation as shown, and a representative center-spool 2. Mounted and free to rotate in the bearing-journal of the center-spool, is the parallel shaft 3 to which is affixed gears 4 and 7. Meshing with gear 4 is gear 5, which is affixed to the output shaft. Meshing with gear 7 is gear 8, which is held stationary and concentric to the input shaft 1 between the center-spool 2, and the prime mover M. Weight W is tied to the output shaft so that positive rotation will raise the weight, and negative rotation will lower the weight. The kinetics being, that energy is transferred to and from the weight as it is raised and lowered by the prime-mover.

The following kinematic equation describes the rotation of the output shaft:

$$W_{out} = W_{in}(1 - R_1/R_2) \tag{1}$$

where:
$R_1$ = Ratio of teeth gears 8/7
$R_2$ = Ratio of teeth gears 5/4
$W_{in}$ = Angular velocity of input shaft
$W_{out}$ = Angular velocity of output shaft
It follows that when:
$R_1 = R_2$ $W_{out}$ is zero $R_1 > R_2$ $\overline{W_{out}}$ is negative
$R1 < R2$ $\overline{W_{out}}$ is positive In order to transpose the kinematics of the model FIG. 1 to that of a center-spool-transmission incorporating square-wave-generators to alter the ratio $R_1$ or $R_2$, let us first examine the kinematics of representative single loops employed in the transmissions.

Figure 3:
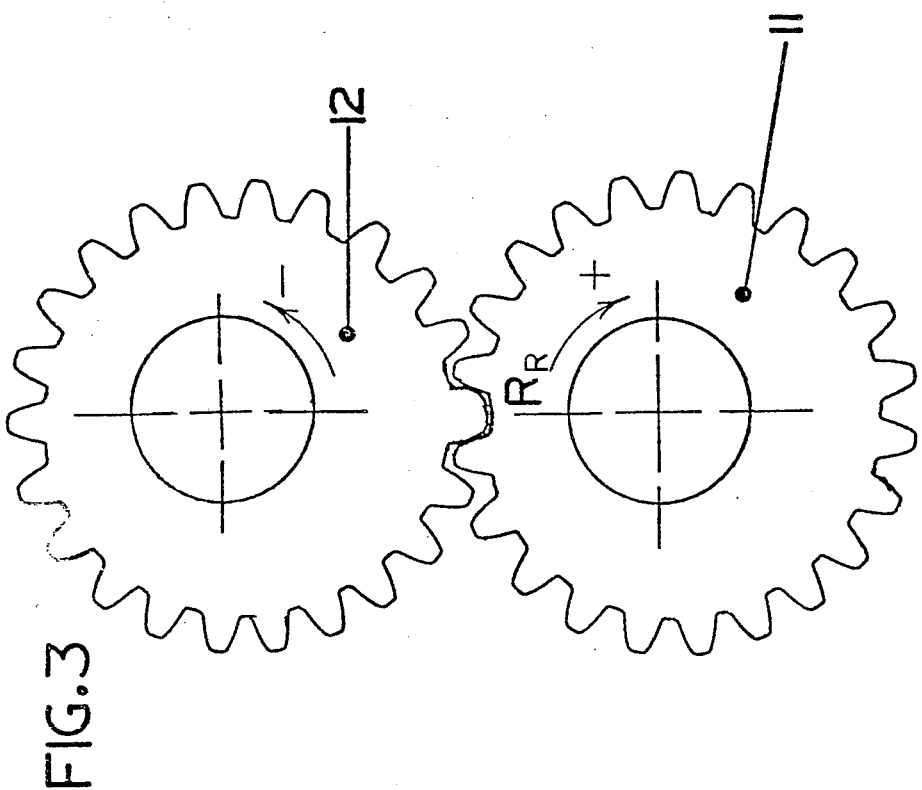
FIGS. 2 and 3 show typical sets of variable-ratio-gears.
Figure 2:
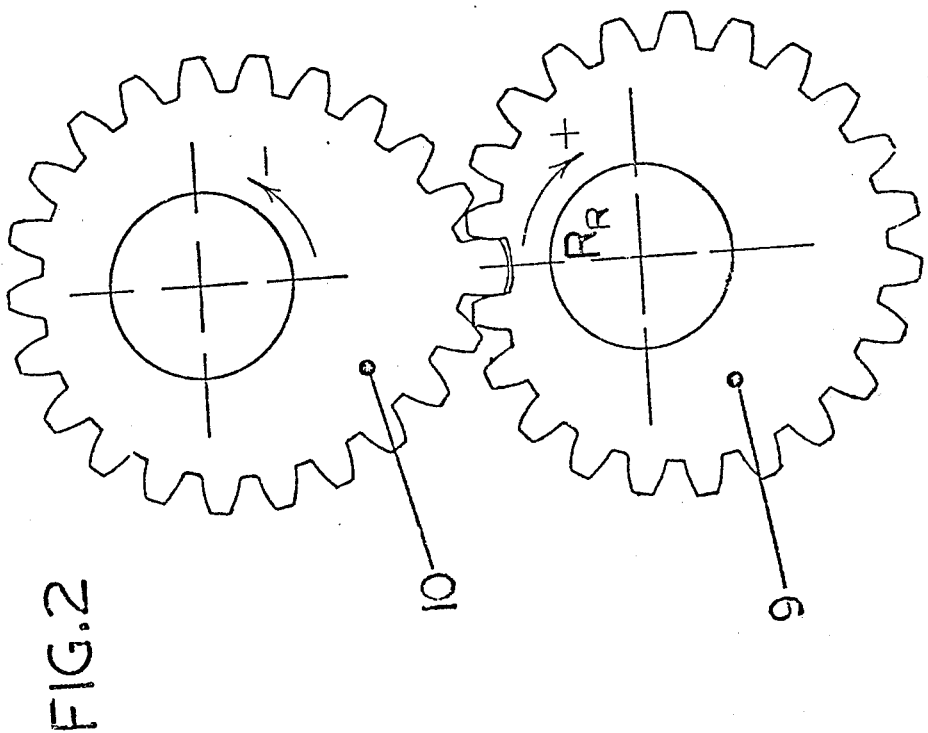
Figure 4:
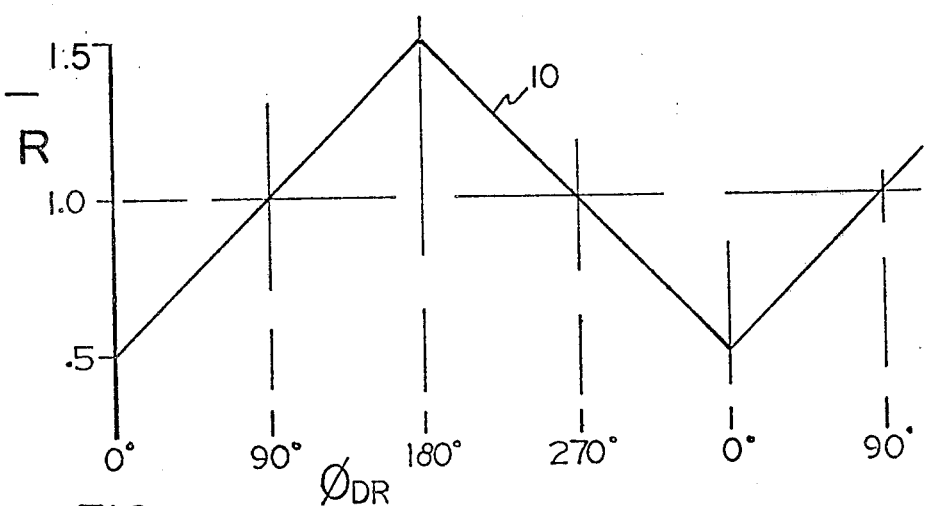
FIGS. 4 and 4A show the relative instantaneous-velocity of the driven-gears of FIGS. 2 and 3.
Figure 4A:
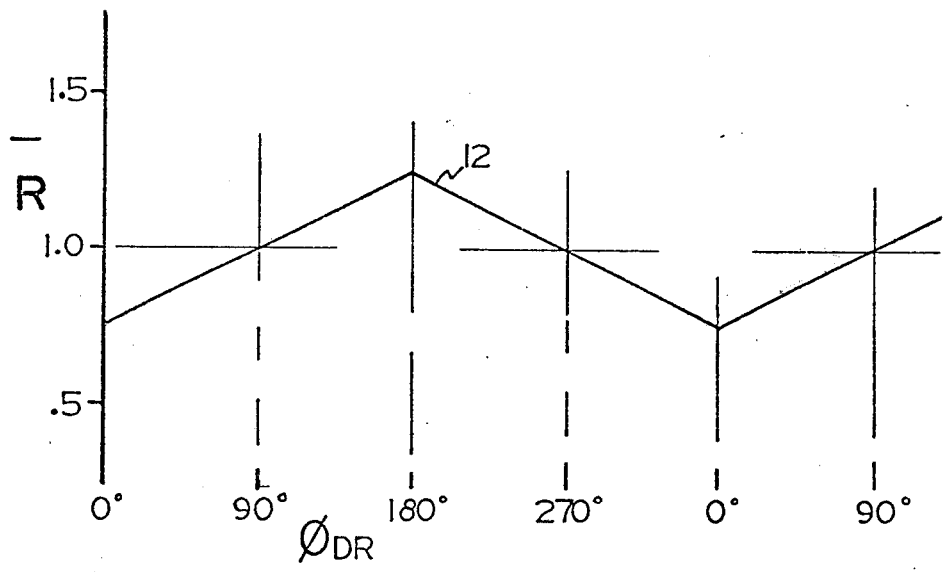

FIGS. 2 and 3 show typical sets of variable-ratio-spur-gears used in the square-wave-generators of these transmissions, with the driver gears identified respectively as items 9 and 11, and their congruent driven-gears identified respectively as items 10 and 12. FIGS. 4 and 4A show the instantaneous-velocity-ratio R of the driven-gears of the sets, as a function of the arc described from the reference-radius of minimum length to the radius of congruency on the pitch-profile of the driver-gear as rotation takes place, where:

$$R = \frac{\text{length of radius of congruency} - \text{driver-gear}}{\text{length of radius of congruency} - \text{driven-gear}}$$

$\phi\, DR$ = Arc in degrees described from the reference radius of minimum length to the radius of congruency on the driver-gear.

The slope of the loci of the instantaneous velocity $R_{10}$, $R_{12}$ of the respective driven gears of the sets, expresses the relative rate of constant positive and negative acceleration that the driven gears are subject to during rotation. As shown in the loci $R_{10}$ and $R_{12}$, driven-gear 12 is subject to half the rate of acceleration as driven-gear 10 when their respective driver-gears are rotating at the same velocity; with their trough and peak velocities respectively 0.75 and 1.25; 0.5 and 1.5. The reference-radius of minimum length has been identified on both driver-gears ($R_R$).

The epicyclic-gear-train, more specifically the bevel-gear type, commonly referred to as a differential-gear-train, has three functional elements: the differential-carrier complete with pinion-gear(s), and the two bevel-gears. With any two of these functional elements subjct to specific rotational-patterns, with cycical co-incidence; the rotational-pattern imposed on the relevant third element is subject to the cyclical co-incidence of the specific rotational-patterns of the restraining-elements.

Figure 5:
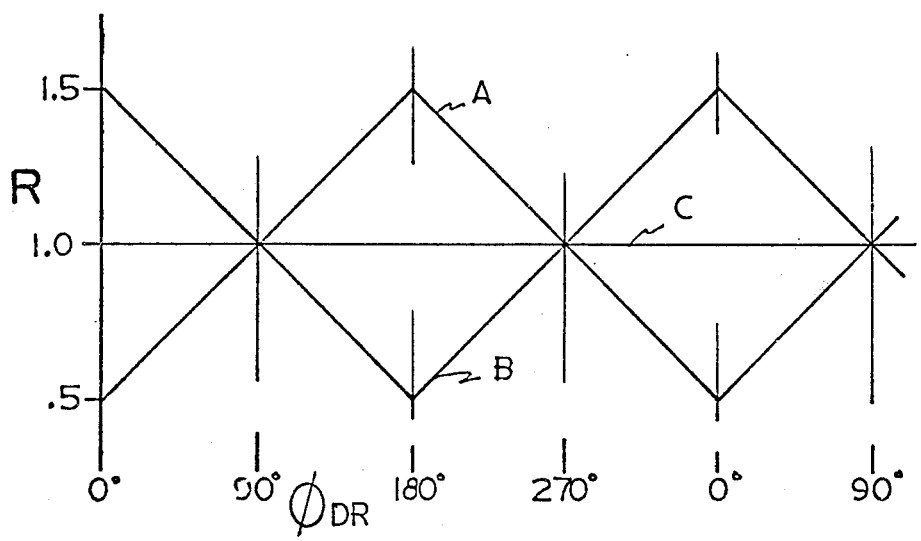
FIGS. 5, 5A, 6, 7 show typical square-wave functions.
Figure 5A:
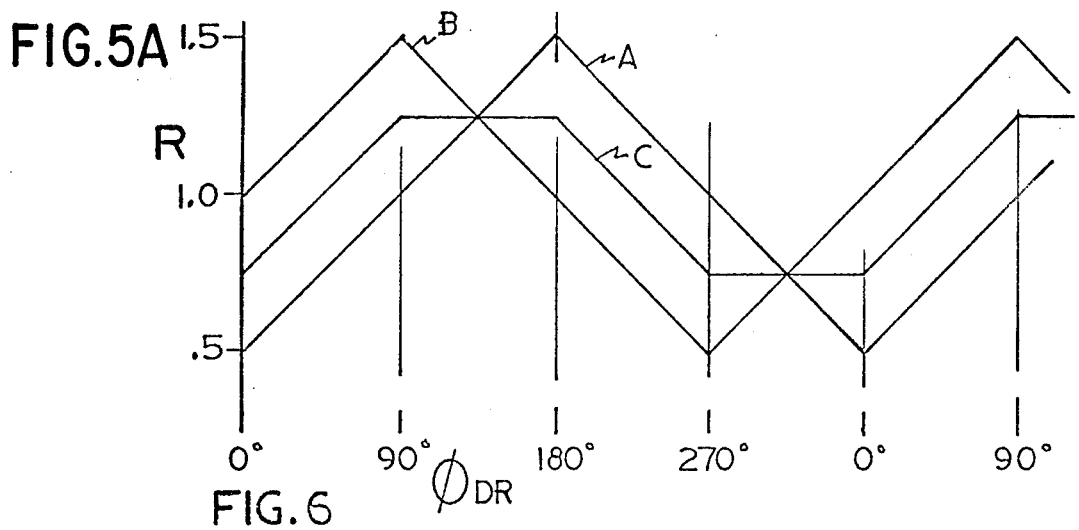

When the two bevel-gears (A and B) of a differential-gear-train are subject to the linear-sawtooth-velocity-patterns of identical driven-gears such as those described in FIG. 1 or FIG. 2, the resultant kinematic-restraint imposed on the differential-carrier would be subject to the relative relationship of the linear-sawtooth-velocity-patterns, described by the loci $R_{10}$ or $R_{12}$ of FIGS. 4 and 4A, and quantifiable by the following equation:

$$W_c^- = \frac{R_A + R_B}{2}$$

where:
$W_c^-$ = the resultant kinematic restraint imposed on the carrier
$R_A$ = either the loci $R_{10}$ or $R_{12}$ on bevel gear A
$R_B$ = respectively loci $R_{10}$ or $R_{12}$ on bevel gear B The graphs of FIGS. 5 and 5A show respectively the resultant kinematic restraint on the carrier C when the bevel-gear A and B are subject to the identical linear-sawtooth-velocity-patterns of driven-gears 10 of FIG. 2, when the reference radii of their driver-gears are rotating 180° from each other, and 90° from each other. The resultant rotational-pattern on the carrier varies from that of constant-velocity-ratio 1X that of the driver-gears, to one described as a square-wave with periods of constant-velocity 0.75 × and 1.25 × the angular velocity of the driver-gears, as their relative-cyclical-coincidence is varied from 180° to 90°. Of significance here, is that the linear-sawtooth-velocity-patterns of the driven-gears must be identical if the required kinematic restraint on the carrier is to be a square-wave function. With the driven-gears of FIG. 3 affixed to the bevel-gears A and B, a square-wave would also be generated, however, the amplitude of the periods of constant velocity would be one-half that of driven-gears 10, when the reference-radii of their driver-gears are rotating 90° from each other.

Figure 6:
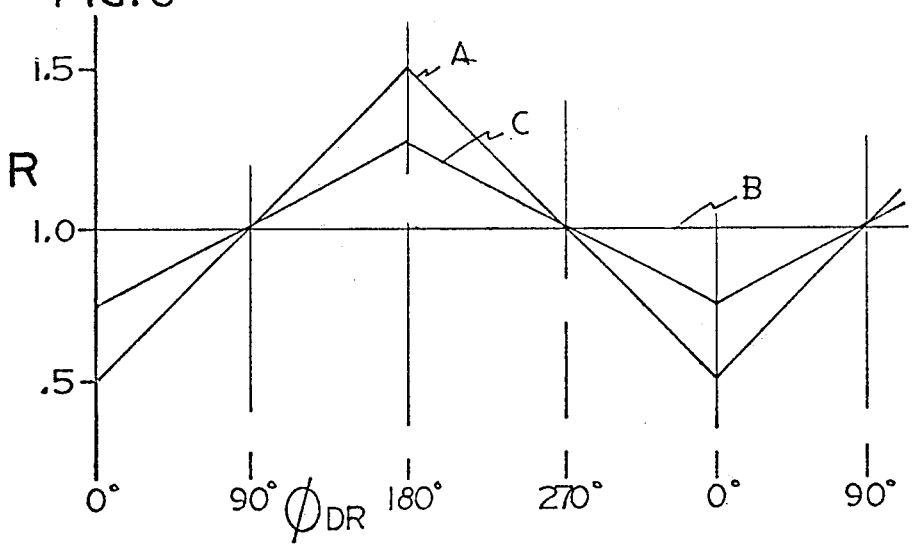
Figure 7:
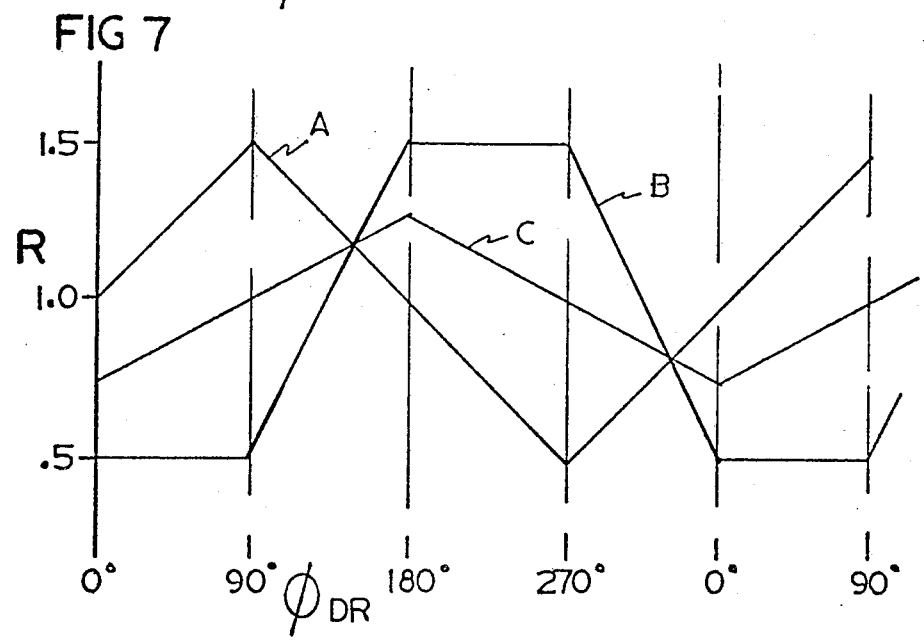

If the carrier C of a differential-gear-train is subject to the linear-sawtooth-velocity-pattern of the driven-gear 12, and one of the bevel-gears A is subject to the linear-sawtooth-velocity-pattern of the driven-gear 10, the resultant kinematic-restraint imposed on the second bevel-gear B would be subject to the relative relationship of the linear-sawtooth-velocity-patterns, described respectively by the loci $R_{12}$ and $R_{10}$, and quantifiable by the following expression:

$$W_B^- = 2R_C - R_A$$

where:
$W_B^-$ = the resultant kinematic restraint imposed on bevel-gear B
$R_C$ = locus $R_{12}$ on carier C
$R_A$ = locus $R_{10}$ on bevel-gear A The graphs of FIG. 6, and FIG. 7 show respectively the resultant kinematic restraint on bevel-gear B when the reference radii of the respective driver-gears of the driven-gears 10 and 12 are rotating coincident with each other, and when at 90° from each other, with the resultant-rotational-pattern on bevel-gear B varying from that on constant-velocity-ratio 1X that of the driver-gears, to one described as a square-wave with periods of constant-velocity 0.5 × and 2.5 × the angular-velocity of the driver-gears, as their relative-cyclical-coincidence is varied accordingly. Of significance here, is that the linear-sawtooth-velocity-pattern of the driven-gear affixed to the differential-carrier must have one-half the rate of acceleration as the driven-gear affixed to the bevel-gear, if the required kinematic-restraint on the second bevel-gear is to be a square-wave function. Any variable-ratio-gear-sets may be used as long as this condition is met.

Figure 8:
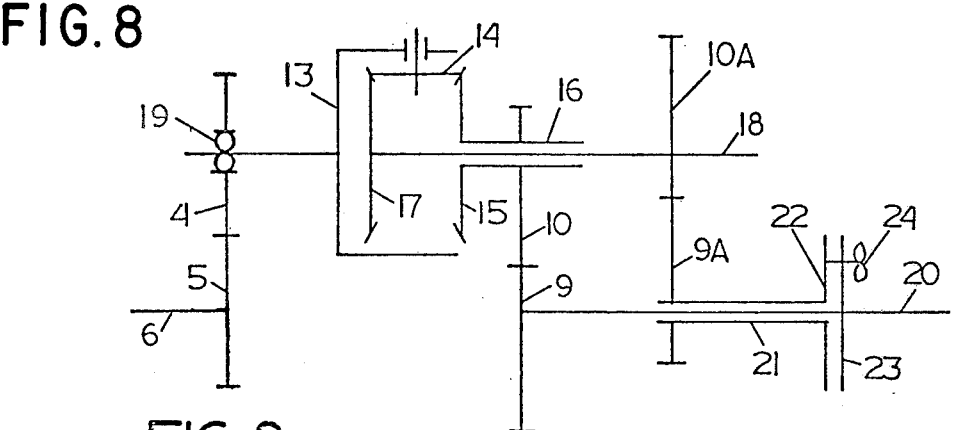
FIG. 8 shows a simple bevel-bevel inverted gear-train-loop.

FIG. 8 shows a single inverted-gear-train-loop incorporating a square-wave-generator with the differential-gear-train such that the differential carrier is the output element of the generator, with the two bevel-gears subject to the linear-sawtooth-velocity-patterns of two identical variable-ratio-driven-gears. To facilitate the proceeding kinematic discussion, the elements of the loop are identified in relation to their function when the output shaft 6 of the transmission is affixed to the common driven-take-off gear. Accordingly, item 5 is the common driven-take-off-gear, with the differential-assembly consisting of the driver-take-off-gear 4, mounted as shown to the differential-carrier 13 by overrunning clutch 19. Pinion 14 is held by the carrier 13 with congruent bevel-gear 17 affixed to shaft 18, to which is affixed variable-ratio-driven-gear 10A. Congruent bevel-gear 15 is affixed to concentric shaft 16, to which is affixed variable-ratio-driven-gear 10. The common reactive members of the transmission consist of the fixed-shaft 20, to which is affixed the variable-ratio-driver-gear 9 and fixed control-flange 23. Concentrically-mounted on the fixed shaft 20 and free to rotate, is the hollow-control-shaft 21, with variable-ratio-driver-gear 9A and rotatable control-flange 22 affixed as shown. Thumbscrew 24 compounds the two control-flanges such that the reference-radius of driver-gear 9A can be positioned relative to the fixed-reference-radius of driver-gear 9.

With the differential-assembly of FIG. 8 rotating around the common axis to shafts 6 and 20, with the value of the take-off-gear-ratio-unity (number of teeth gears 5/4), and with the reference-radii of driver-gears 9 and 9A held fixed 180° from each other; the output shaft will have no rotation if the overrunning-clutch is so oriented that torque is transferred from the carrier 13 to the driver-take-off-gear 4, when the torque-load on the output shaft is in the same direction as input rotation. This can be shown by applying equation (1) to the kinematics of the loop of FIG. 8 with due consideration to the kinematics of the square-wave-generator.

Figure 10:
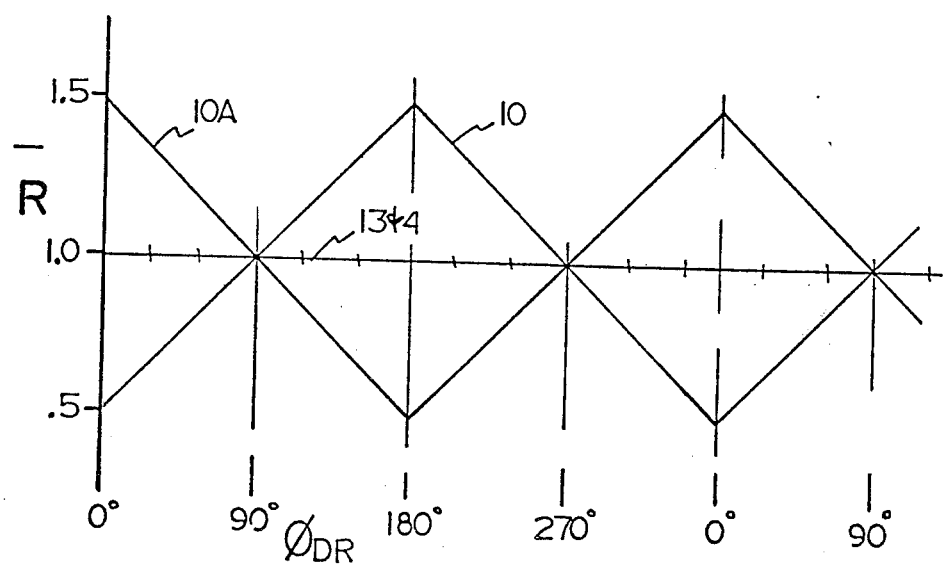
FIGS. 10 and 11 show the kinematics of the loop (FIG. 8)

Accordingly, FIG. 10 shows the steady rotation of the carrier 13, relative to the linear-sawtooth-rotation of the driven-gears 10 and 10A when the reference-radii of their driver-gears 9 and 9A are held fixed 180° from each other. The relative-ratio between the carrier 13 and the driver-gears 9 and 9A remains at unity throughout the relative-cyclical-rotation of the variable-ratio-gears, with this relative-ratio shown as $R_1$ in equation (1), with the take-off-gear-ratio shown as $R_2$, which as stated in also unity, the value of equation (1) becomes $$W_{out} = 1\,(1 - 1/1) = 0$$

Figure 11:
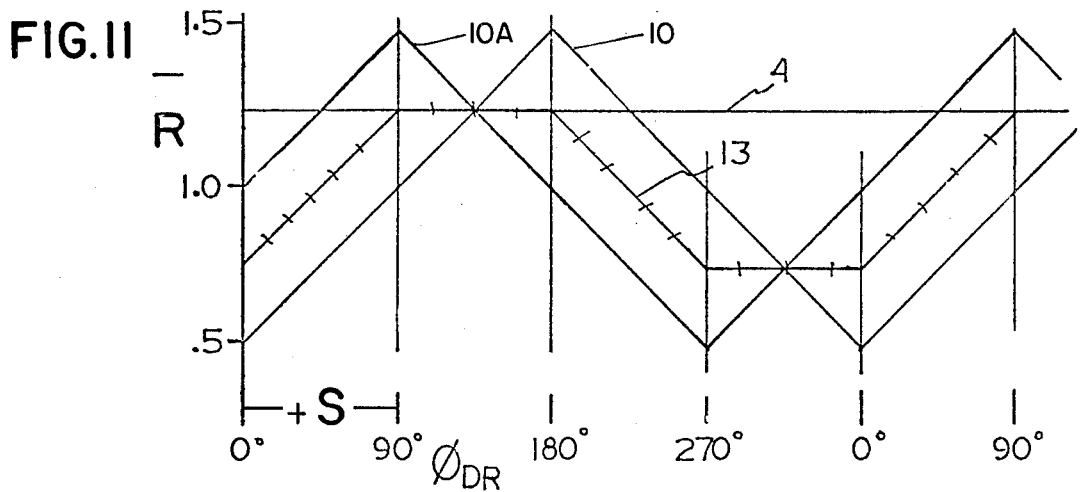

FIG. 11 shows the square-wave-oscillation of the carrier 13, relative to the linear-sawtooth-rotation of the driven-gear 10 and 10A when the reference-radii of their driver-gears 9 and 9A are held fixed at 90° to each other. The relative ratio between the carrier 13 and the driver-gears 9 and 9A varies from 0.75 to 1.25 in a square-wave-pattern, with period of constant-velocity-ratio for durations of 90° relative-rotation of the driver-gears. The ratio $R_1$ in equation (1) is, therefore, a variable, with the result that the output shaft will have a steady rotation in both the positive and negative sense for periods of 90° of relative-rotation of the driver-gear, or stated more simply, for 90° rotation of the differential-assembly around the common axis of the loop. This can again be shown by equation (1) if the value of $R_1$ is treated as a variable, expressed by the relative-magnitude of the periods being generated in the generators, i.e., 0.75 and 1.25, accordingly:

$$W_{out} = 1\,(1 - \frac{(R_1)_{.75}^{1.25}}{1})$$

$$= +.25\ -.25$$

With four differential-assemblies as shown in FIG. 8 evenly spaced around the common axis of the loops so that the relative periods of constant-velocity-ratio being generated in the loops are consecutive, the output shaft will rotate continuously at a constant velocity $-0.025\times$ the rotation of the generator assemblies, as a function of the maximum value of the ratio $R_1$ being generated, since, when the velocity-ratio of any carrier falls below the continuum-value the overrunning-clutch will overrun, as the continuum-velocity is maintained on the four driver-take-off-gears by the active-generator-loop.

Since, with the reference-radii of the driver-gears 9 and 9A held fixed at 180° to each other the output shaft had no rotation; and since, with the reference radii of the driver-gears 9 and 9A held fixed at 90° to each other the output shaft had a rotation $-0.25\times$ the input on the generator-assemblies, it follows that a center-spool-transmission incorporating the loop of FIG. 8 would have a limited infinitely-variable capability with infinite-translation, subject to the relative angle between the fixed-reference-radii of the variable-ratio-driver-gears. Translation is defined as the ratio of input to output angular velocity $$\left(\frac{W_{in}}{W_{out}}\right).$$

Further, since the effective value of the ratio $R_1$ is unity when the reference radii of the driver-gears 9 and 9A are held fixed at 180° to each other; and since the effective value of the ratio $R_1$ is 1.25 when the reference radii of the driver-gears 9 and 9A are held fixed at 90° to each other; it follows that kinematic-continuum through the transmission-drive-train-loops occurs only when the sequential-periods of constant-velocity-ratio being generated in the loops are those periods with amplitude equal to or greater than unity. Although the instantaneous-velocity of the carrier varies from 0.75 to 1.25× that of the driver-gears, because of the restriction imposed on the loops by the overrunning-clutches, kinematic-continuum is restricted to those periods with relative-amplitude at or greater than unity. Therefore, the effective value of $R_1$ in equation (1) varies from 1 to 1.25. Equation (1) can be used to indicate the range of translation of the transmission if $R_1$ is shown as a variable with the above limits:

$$W_{out} = W_{in}\,(1 - \frac{(R_1)_1^{1.25}}{1})$$

$$= 0 \text{ to } -.25 \times W_{in}$$

With the overrunning-clutch in the loop of FIG. 8 such that the differential-carrier 13 accepts torque from the driver-take-off-gear 4, rather than as has been established, then the load-torque on the output shaft would not be maintained. If however, both the load-torque and the orientation of the overrunning-clutch are changed, kinematic-continuum through a transmission with four loops would occur only when the sequential periods of constant-velocity-ratio being generated in the loop are those periods with amplitudes equal to or less than unity. Therefore, in this case the effective value of $R_1$ in equation (1) would vary from 0.75 to 1, and the transmission would again have a limited infinitely-variable capability, however, output rotation would be in the opposite sense. Equation (1) can be used to indicate the range of translation of the transmission if $R_1$ is again shown as a variable with the above limits:

$$W_{out} = W_{in}\,[1 - \frac{(R_1)_{.75}^1}{1}]$$

$$= 0 \text{ to } +.25 \times W_{in}$$

It is to be noted that the variation in $R_1$ is specific to the kinematics of the square-wave-generator and not to the kinematics of the loop of FIG. 8. The relative-variation in the ratio $R_1$ is, therefore, the amplification-characteristic of the square-wave-generator, and subject to the relative-orientation of the overrunning clutch and the applied load. This characteristic of the generator is given the symbol $\tau$ and because $R_1$ in equation (1). The ratio $R_2$ in equation (1) is the ratio of the take-off-gears (gear 5/gear 4). Again, for convienience, the take-off-ratio is shown by the letters TOR. To cover the more general case of a center-spool-transmission, incorporating a square-wave-genereator in the loop, with the common driven-take-off-gear the output of the transmission, equation (1) is rewritten as follows:

$$W_{out} = W_{in} \left[ 1 - \frac{\tau}{TOR} \right] \quad (2)$$

where:
- TOR = The ratio of the number of teeth on the common driven-take-off-gear divided by the number of teeth on the driver-take-off-gear.
- $\tau$ = in the amplification-characteristic of the generator subject to the orientation of the clutch and output torque-load. $W_{out}$ and $W_{in}$ are respectively the angular-velocity of the output shaft and the center-spool.

Figure 9:
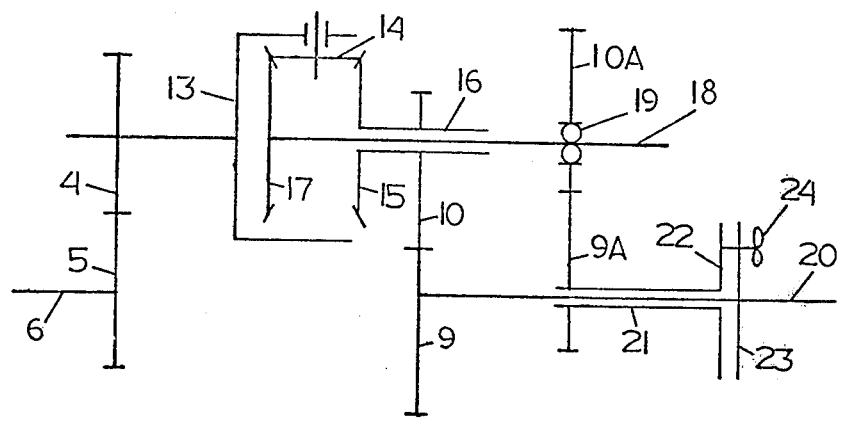
FIG. 9 shows the loop (FIG. 8) with overrunning-clutch repositioned.

FIG. 9 shows a single inverted-gear-train-loop similar to that shown in FIG. 8 with the elements identified accordingly, except that the differential-carrier 13 is affixed directly to the driver-take-off-gear 4, and variable-ratio-driven-gear 10A is mounted to shaft 18 by the overrunning-clutch 19.

Figure 12:
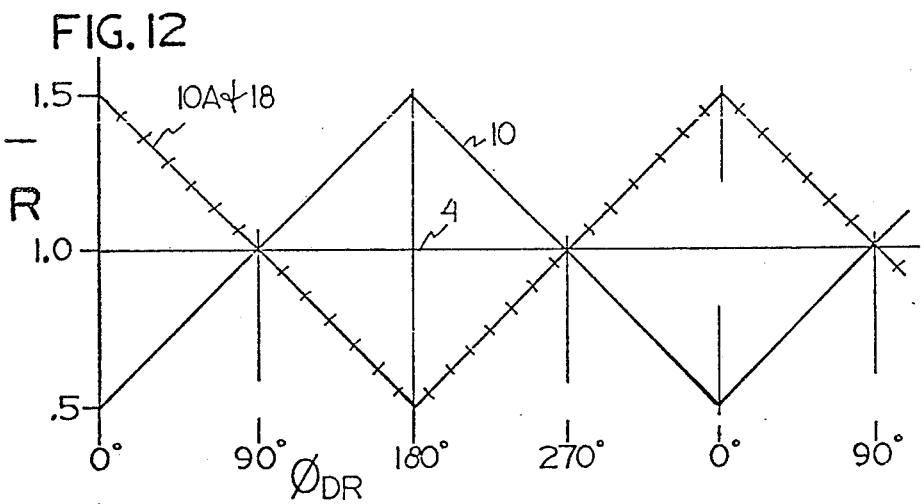

FIG. 12 shows the relative-velocity-rotation of the driven-variable-ratio-gears 10 and 10A, the carrier 13, and the shaft 18, with the differential-assembly rotating around the common axis to the loop and with the reference-radii of the driver-gears held fixed 180° from each other. As shown, the generator output on the differential-carrier 13 is unity. Accordingly, $\tau$ in equation (2) is 1, and with the take-off-ratio TOR = 1, the output shaft remains at rest:

$$W_{out} = 1 \left( 1 - \frac{1}{1} \right) = 0$$

Figure 13:
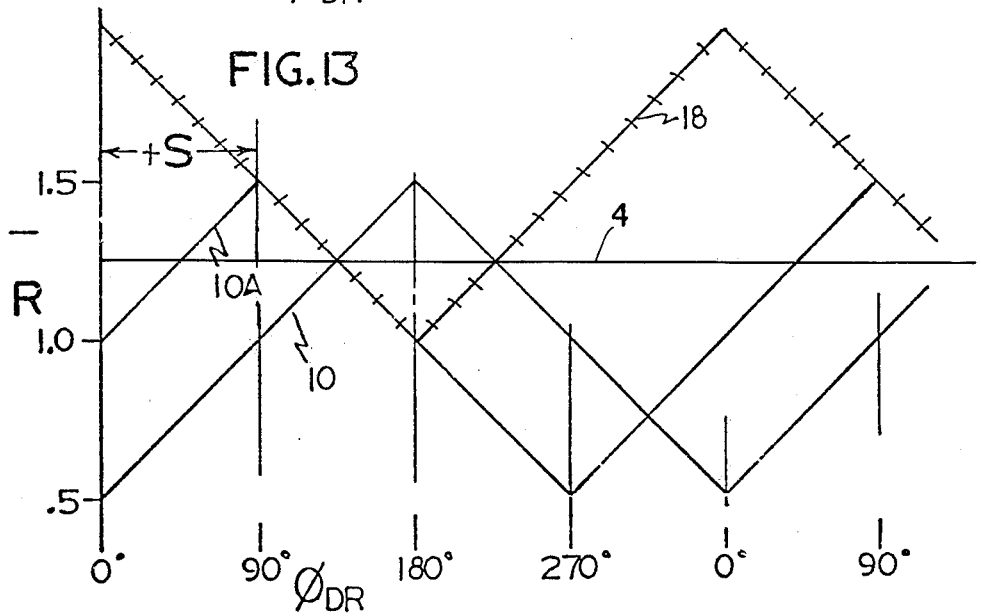

With the overrunning clutch orientated such that torque is transferred from the driven-variable-ratio-gear 10A when relative rotation is coincident with that of shaft 18, and load-torque on the output shaft 6 is in the same direction as input rotation, the relative-velocity-rotation of the driven-gears 10 and 10A, shaft 18, and the differential-carrier 13 will be as shown in FIG. 13, when the reference-radii of the driver-gears are held fixed at 90° from each other with four differential-assemblies rotating around the common axis to the transmission. Accordingly, the value of $\tau$ in equation (2) will be 1.25 and the output velocity will again be $-0.25\times$ input.

With the overrunning-clutch orientated such that torque is transferred from shaft 18 to driven-gear 10A when their rotation is coincident, and the load-torque on the output-shaft 6 is in the opposite direction as input-rotation, the relative-velocity-rotation of the driven-gears 10 and 10A, the shaft 18, and the differential-carrier 13 will be as shown in FIG. 13A when the reference-radii of the driver-gears are held fixed at 90° from each other, and with four differential-assemblies rotating around the common axis to the transmission. Accordingly, the value of $\tau$ in equation (2) will be 0.75 and the output-velocity will be $+0.25\times$ input.

From this discussion it has been shown that the loops of FIG. 8 and FIG. 9 have the same application to a center-spool-transmission, and incorporation of the overrunning-clutch between either the differential-carrier 13 and the driver-take-off-gear 4, or the driven-variable-ratio-gear 10A and the shaft 18, does not alter the kinematics of the transmission, if the take-off-ratio (TOR) of the loop and the variable-ratio-gear-sets are the same.

Figure 14:
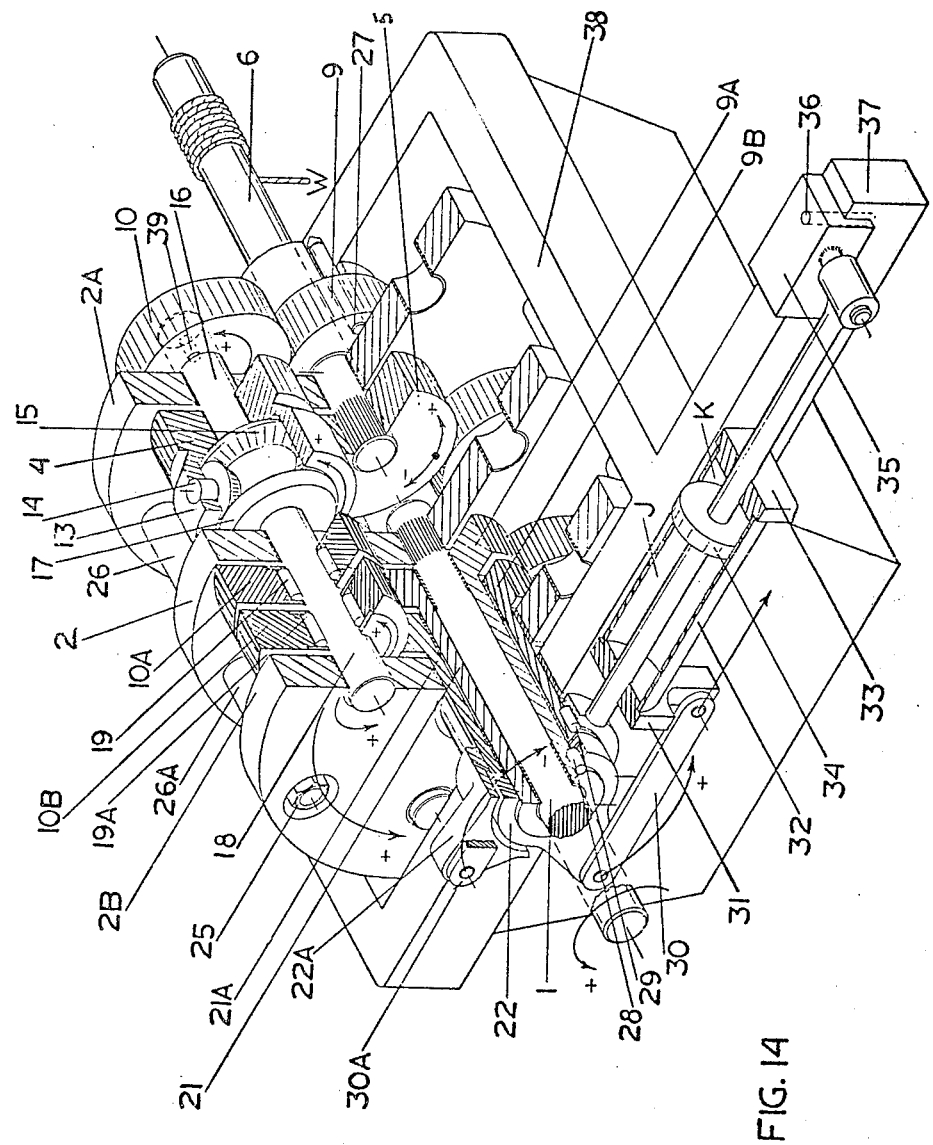
FIG. 14 shows an isometric view of a driven-take-off-gear output-transmission.

FIG. 14 is a sectioned isometric view showing a center-spool-transmission consisting of four inverted-gear-train-loops similar to the single-loops shown in FIG. 9, with the revelant element identified accordingly, with a second rotatable-variable-ratio-driver-gear, and a hydraulic control-system added. Item 38 is the bottom half of the stationary-transmission-housing, with the split-line on the common center-line to the input and output shaft 1 and 6. Affixed to the input as shown is the center-disk 2 of the center-spool, with the front disk 2A and the rear disk 2B held together as a unit with the bolts 24 and spacers 26 and 26A. Concentric to the input-shaft is the control-shaft 21, to which is affixed the variable-ratio-driver-gear 9A and the control-arm 22, held by Key 28. Concentric to control-shaft 21 is a second control-shaft 21A, to which is affixed the variable-ratio-driver-gear 9B and the control-arm 22A, held by key 29. Attached to the control-arms 22 and 22A are the control-links 30 and 30A such that they tie the control-arms to the control-actuator-front-cap 31 as shown, when the actuator is in the extended position and the reference-radii of the attached driver-gears are coincident, pointing downwards perpendicular to the split-line of the transmission housing. The hydraulic-actuator consists of the actuator-cylinder 32, the actuator-rear-cap 33, and the actuator-piston and rod 34, with the piston-rod affixed to the extension of the transmission-housing 37, by bracket 35 and pin 36. Concentric to the output-shaft 6 and affixed to the transmission-housing by key 27, with reference-radius upwards and perpendicular to the split-line of the transmission-housing, is the fixed variable-ratio-driver-gear 9. Attached to the output-shaft is the common driven-take-off-gear 5, with supporting-journals in the front disk and the fixed-driver-gear 9. Congruent to the fixed-driver-gear 9 is the driven-gear 10 affixed to shaft 16 by key 39, and passing through the front disk 2A and the driver-take-off-gear 4 with bevel-gear 15 affixed as shown. Take-off-gear 4 being congruent to driven-take-off-gear 5 and affixed to differential-carrier 13, with differential-pinion 14 congruent to bevel-gears 15 and 17. To bevel-gear 17 a shaft 18 is affixed with supporting-journals in the center disk 2 and rear disk 2B. Concentrically-mounted on shaft 18 with overrunning-clutches 19 and 19A, and congruent to driver-gears 9A and 9B, are driven-variable-ratio-gears 10A and 10B. The weight $W$ is attached to the output-shaft as shown; the variable-ratio-gear-sets are as shown in FIG. 2; the take-off-ratio TOR = 9/8; the overrunning-clutches are orientated so that they transmit torque to shaft 18, with the generator-amplification-characteristic $\tau$ varying from 1 to 1.25 as the reference-radii of driver-gears 9A and 9B are changed from 180° to 90° coincidence with the reference-radius of driver-gear 9.

With the input-shaft and attached center-spool rotating in a positive sense as shown, with a value of unity, and the relative reference-radii of the driver-gears held fixed 180° from each other as shown by the relative position of the control-actuator, the output of the transmission will be, from equation (2): $$W_{out} = 1 \ (1 - \frac{1}{9/8}) = +1/9$$

with the result that the weight $W$ will lower with energy being transferred from the weight to the prime-mover. The kinematics of the relevant elements of the four generator-assemblies will be as shown in FIG. 15, with all over-running-clutches in the transmission engaged, as shown by the relative-coincidence of their driven-gears 10A and 10B with their respective shafts 18.

When the control-actuator-body is repositioned so that the relative-angular-displacement of the driver-gears 9A and 9B is respectively −45° and +45° with reference to the fixed-driver-gear 9, as caused through the relative linkage to the control-arms 22 and 22A, the relative angle between the reference radii of the fixed-driver-gear 9, and driver-gears 9A and 9B will be 135°. The amplification-characteristic $\tau$ of the generators in the loops will be 1.125 or 9/8, and the output shaft will be stationary. The kinematics of the relevant elements of the four generator-assemblies as shown in FIG. 16, with each over-running-clutch engaged for 135° rotation of the center-spool. Again, this is shown by the relative-coincidence of their driven-gears 10A and 10B with the shafts 18. From equation (2):

$$W_{out} = 1 \ (1 - \frac{9/8}{9/8}) = 0$$

With the control-actuator-body positioned so that the relative-angular displacement of driver-gears 9A and 9B is respectively −90° and +90°, their reference-radii will be ±90° from the reference-radius of fixed-driver-gear 9, and the amplification-characteristic $\tau$ of the generators will be 1.25 or 5/4, with each overrunning-clutch engaged for 90° rotation of the center-spool. This is shown in FIG. 17. From equation (2) the output will be:

$$W_{out} = 1 \ (1 - \frac{5/4}{9/8}) = - \frac{1}{9}$$

with the result that the weight $W$ will raise with energy being transferred from the prime-mover to the weight.

From this and the preceeding discussion it has been shown that kinematic translation through a center-spool-transmission is subject to the take-off-ratio TOR, the relative orientation of the overrunnning-clutches, the external loads, and the relative relationship of the reference-radii of the variable-ratio-driver-gears.

FIG. 18 shows a single inverted-gear-train-loop incorporating a square-wave-generator with the differential-gear-train such that one of the bevel-gears of the differential is the output element of the generator, with the differential-carrier and the second bevel-gear subject to the linear-sawtooth-velocity-patterns of the variable-ratio-driven-gears, and with the driven-gear affixed to the carrier having half the rate of acceleration in its linear-sawtooth-velocity-pattern as the driven-gear affixed to the bevel-gear of the differential. Item 5 is the common take-off-gear and 6 the output shaft. The differential-assembly consisting of the driver-take-off-gear 4, mounted as shown, to shaft 16 by the over-running-clutch 19, with affixed bevel-gear 15. Pinion 14 is held by the carrier 13, with congruent-bevel-gear 17 affixed to shaft 18 together with variable-ratio-driven-gear 10, and with variable-ratio-driven-gear 12 affixed to the carrier as shown. Congruent to driven-gears 12 and 10 are respectively variable-ratio-driver-gears 11 and 9, with driver-gear 9 affixed to the fixed shaft 20 together with the fixed control-flange 23. Concentrically-mounted on the fixed-shaft 20, and free to rotate, is the hollow-control-shaft 21 with driver-gear 9 and rotatable-control-flange 22 affixed as shown. Thumbscrew 24 compounds the two control-flanges such that the reference-radius of driver-gear 9 can be positioned relative to the fixed reference-radius of driver-gear 11.

Figure 20:
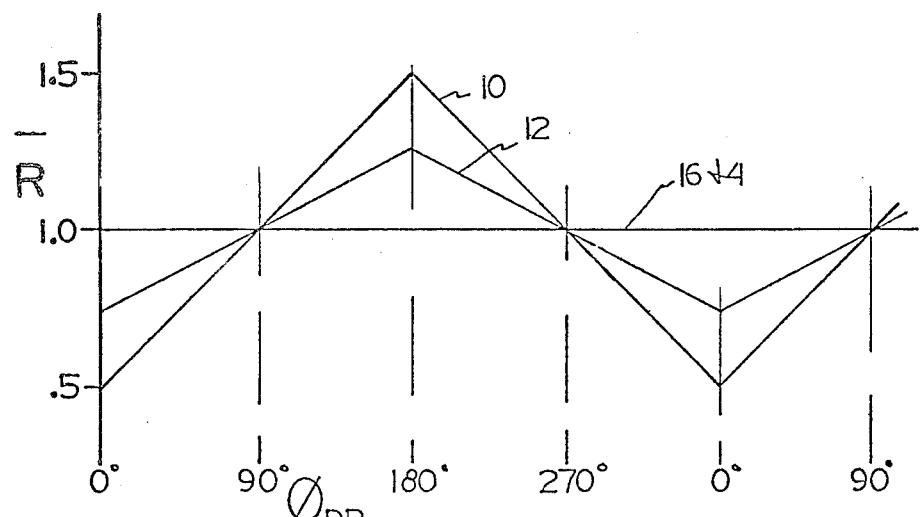
FIGS. 20 and 21 show the kinematics of the loop of FIG. 18.

With the differential-assembly of FIG. 18 rotating around the common axis to shaft 6 and 20, the take-off-ratio TOR = 1, and the reference-radii of the driver-gears 9 and 11 held fixed and coincident to each other, the relative-kinematics of the elements of the differential-assembly will be as shown in FIG. 20. Accordingly, from equation (2), the output of the transmission will be zero:

$$W_{out} = 1 \ (1 - \frac{1}{1}) = 0$$

Figure 21:
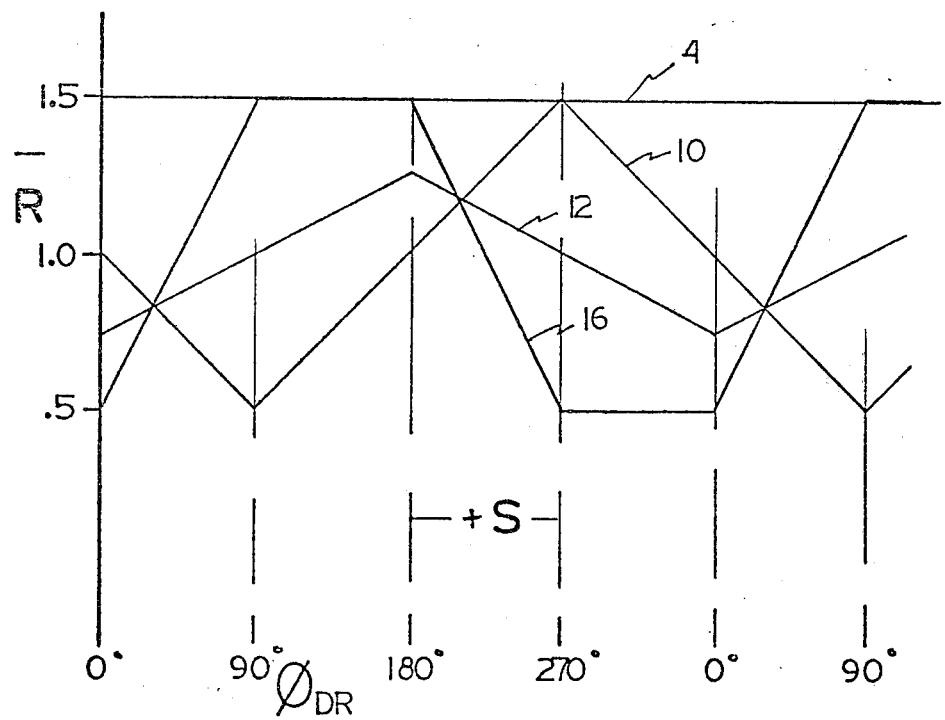

With the reference-radii of the driver-gears held fixed at 90° to each other, the relative-kinematics of the elements of the differential-assembly will be as shown in FIG. 21. Accordingly, from equation (2) the output of the transmission will be a square-wave with periods of constant-velocity −5× and +5× the rotational-velocity of the differential-assembly for durations of 90°, when the overrunning-clutch is orientated to transmit torque to the driver-take-off-gear and the load-torque is in the same sense as the rotating-differential-assembly, since $\tau$ has a value varying from 0.5 to 1.5:

$$W_{out} = 1 \ (1 - \frac{[\tau]_s^{1.5}}{1}) = +.5\times \text{ to } -.5\times \text{ input}$$

Again, with four differential-assemblies as shown in FIG. 18, evenly spaced around the common axis of the loops, the relative-periods of constant-velocity-ratio will be consecutive with the output remaining −0.5× input, with the overrunning-clutch of the loops overrunning when the rotation of the bevel-gear 15 and shaft 16 falls below the continuum-velocity of the driver-take-off gear 4, which is maintained by the active-generator-loop, so that equation (2) becomes:

$$\overline{W_{out}} = 1 \left(1 - \frac{[\tau]_1^{1.5}}{1}\right) = 0 \text{ to } -.5 \times \text{input}$$

FIG. 19 shows a single inverted-gear-train-loop similar to that shown in FIG. 18 with the elements identified accordingly, except that shaft 16 is affixed to the driver-take-off gear 4, and variable-ratio-driven-gear 10 is mounted to shaft 18 by the overrunning-clutch 19.

FIGS. 22 and 24 show respectively the relative-kinematics of the relevant element when the reference-radii of the driver-gears 9 and 11 are held coincident, and when held at 90° to each other, as they would appear with four differential-assemblies rotating about the common axis with the driver-take-off-gear 4 rotating at continuum-velocity.

Again, the loop FIG. 18 and FIG. 19 have the same application to a center-spool-transmission and incorporation of the overrunning-clutch on the shaft of either bevel-gear does not alter the kinematics of the transmission loop.

With reference to the model FIG. 1, thus far we have dealt with the case where the ratio $R_1$ is varied and $R_2$ is held fixed. This being the case when the common-driven-take-off-gear of the inverted-gear-train-loops of center-spool-transmission is the output element, and the common variable-ratio-driver-gears of the generators is the reactive-element of the transmission, with the output characteristic expressed by equation (2):

$$\overline{W_{out}} = \overline{W_{in}} \left(1 - \frac{\tau}{TOR}\right) \quad (2)$$

With the ratio $R_2$ variable, and the ratio $R_1$ fixed, being the case when the common-driven-take-off-gear of the inverted-gear-train-loops of center-spool-transmissions is the reactive element, and the common-variable-ratio-driver-gears of the generators is the output element of the transmission, equation (2) must be rearranged accordingly, to obtain a suitable equation to show output characteristics:

$$\overline{W_{out}} = \overline{W_{in}} \left(1 - \frac{TOR}{\tau}\right) \quad (3)$$

FIG. 24 is a sectioned isometric view showing a center-spool-transmission with four inverted-gear-train-loops similar to the single loop shown in FIG. 19, with one f the differential-assemblies removed. The relevant elements are identified accordingly, and a second rotatable-variable-ratio-driver-gear and associated elements of a rotary-hydraulic-actuated-control-system has been added. The reactive-element of the transmission is the common-driven-take-off gear to the loops, and the variable-ratio-driver-gears are the output element of the transmission. Item 2 is the rear-flange of a center-spool-casing with a center-line-splined outside-boss for attaching to a prime-mover, together with an outside center-line bearing-journal and four evenly-spaced journals around the center axis. Item 2A is a center-spool-front-flange and cylindrical casing with bearing-journals similar to the rear-flange, and held to the rear-flange by bolts 25. Extending through the center-journal of the front-flange is a hollow shaft 41 with one end affixed to the driven-take-off gear 5, and with the other end keyed to a stationary-bracket 42, by key 43. Extending from the center-journal of the rear-flange 2, through hollow-shaft 41, is the output shaft 20, to which is affixed variable-ratio-driver-gear 11 and actuator-rotor 49. Concentrically-mounted to the output-shaft is a rotatable-control-shaft 21 with affixed-variable-ratio-driver-gear 9 and control-differential bevel-gear 45, keyed by 46. Concentrically-mounted on control-shaft 21 is a second rotatable-control-shaft 21A with affixed-variable-ratio-driver-gear 9A and rear-flange 48 of the control-actuator, keyed by 44. Actuator-housing 53 is held to rear-flange 48 by through-bolts 54, with the control-differential-bevel-gear 52 affixed as shown with key 47. Mounted in the kidney-shaped-cavity of the rotor 49 and held by shaft 50 is the control-differential-pinion 51. Shaft 55 of the differential-assembly extends through the journal of both the rear and front flangs of the center-spool, with variable-ratio-driven-gear 12, and differential-carrier 13 and pinion 14 affixed as shown. Concentric to shaft 55 is shaft 40, with affixed-driver-take-off-gear 4 and differential-bevel-gear 15. Concentric to shaft 55 is shaft 18 to which is affixed bevel-gear 17. Concentrically-mounted to shaft 18 with the overrunning-clutches 19 and 19A are the variable ratio-driven-gears and 10A. The weight $\omega$ is attached to the output-shaft 20 as shown. The variable-ratio-gear-sets are as shown respectively in FIG. 2 and 3. The take-off-ratio TOR = 2/3, with the overrunning-clutches orientated to accept torque from shaft 18, so that the generator-amplification-characteristic $\tau$ varies from 0.5 to 1. The relative position of the elements of the control-actuator are as shown in FIG. 25, when the reference-radii of the driver-gear 9 and 9A are coincident to the relatively-fixed reference-radius of driver-gear 11 on output shaft 20.

With input to the center-spool in a positive sense as shown, the relative kinematics of the relevant elements of the four differential-assemblies incorporated in the transmission will be as shown in FIG. 26, and the generator output $\tau = 1$. Accordingly, from equation (3), the output shaft of the transmission will rotate in a positive sense at $+1/3\times$ the input-velocity on the center-spool:

$$\overline{W_{out}} = 1 \left(1 - \frac{2/3}{1}\right) = +\frac{1}{3}$$

with the result that the weight $\omega$ will lower with energy being transferred from the weight to the prime-mover.

With the control-actuator-body 53 rotated in a positive sense relative to the output-shaft 20, as caused by the flow of controlled fluid into chamber K, the affixed control-shaft 21A and control-bevel-gear 52 will also rotate in the same sense, with the control-bevel-gear 45 and attached control-shaft 21 rotating in the opposite sense, as caused by the interaction of the control-bevel-gears on the fixed control-pinion 51. The relative displacement of the reference-radii of the driver-gears 9A and 9, from the relatively-fixed reference-radius of driver-gear 11 will be the same, but in the specific sense. FIG. 27 shows the relative kinematics of the relevant elements of the differential-assemblies, when the amplification-characteristic of the generators $\tau = \frac{2}{3}$. Accordingly, the output shaft would have no rotation as shown by equation (3):

$$\overline{W_{out}} = 1 \left(1 - \frac{2/3}{2/3}\right) = 0$$

FIG. 28 shows the relative kinematics of the relevant elements of the differential-assemblies when the amplification-characteristic of the generator $\tau = \frac{1}{2}$. Accordingly, the output shaft will have a rotation $-\frac{1}{3} \times$ input, again shown by equation (3):

$$W_{out} = 1 \ (1 - \frac{\frac{2}{3}}{\frac{1}{2}}) = -\frac{1}{3} \text{ input}$$

with the result that the weight $\omega$ will raise, with energy being transferred from the prime mover to the weight.

The center-spool-transmission-loops shown respectively in FIGS. 8, 9, 14, and FIGS. 18, 19, 24, incorporate the square-wave-generators of my referenced copending Canadian patent application Nos. 150-163 and 193-761. The transmission layouts in FIGS. 14 and 24, show the relative arrangements of the elements of the loops when: the common drive-take-off-gear of the loop is the output element, and the common variable-ratio-drive-gears of the generators is the reactive-element of the transmission; and when: the common variable-ratio-driver-gears of the generators is the output-element, and the common driven-take-off-gear of the loops is the reactive-element of the transmission.

The loops shown in FIGS. 8, 9, 18, 19, can be incorporated in the layouts of the transmission, FIGS. 14 and 24, by eliminating the second control-shaft 21A and associated irrelevant elements of the layouts, with the translation-characteristic of the transmissions subject to the specific generator-characteristic of the incorporated generator. Further, it has been shown that: the generators of the loops, FIGS. 8, 9, and 14 have the same kinematic characteristic, i.e. $\tau$ varies from 1 to 1.25 when the reference-radii of the driver-gears are changed from 180° to 90° coincident-rotation; and, the generators of the loops, FIGS. 18, 19, 24, have the same kinematic characteristic, i.e. $\tau$ varies from 1 to 0.5 when the reference-radii of the driver-gears are changed from coincident to 90° coincident rotation. Accordingly, the transmission layouts of FIGS. 14 and 24 would have the same translation characteristic with either loops of FIGS. 8, 9, incorporated, or with the loop of FIGS. 18, 19, incorporated, as they have or would have with the loops shown in FIGS. 14 and 24 incorporated with the specific translation-characteristics of the transmissions expressed respectively, by equations (2) and (3), with kinematic-continuum through the drive-trains of either transmission assured by the 90° periods of constant-velocity generated consecutively in the four loops, if relative-displacement of the reference-radii of the rotatable-driver-gears does not exceed ± 90° from the fixed driver-gears of the loops.

When two rotatable-driver-gears are incorporated in the generators, as shown in FIGS. 14 and 24, and when ± 90° coincident rotation of the linear-sawtooth-velocity-patterns of the rotatable-driven-gears with that of the relatively-fixed-driven-gear is effected, two consecutive periods of 90° relative rotation of the driver-gears are generated in each loop. This occurs when the differential-gear-train integrates consecutively, the relative linear-sawtooth-velocity-pattern of the driven-gear congruent to the relatively-fixed-driver-gear with the linear-sawtooth-velocity-patterns of the driven-gears congruent to the two rotatable driver-gears. The resulting kinematic-continuum through the loop is for 180° relative-rotation of the driver-gears. This is shown in FIG. 17 and FIG. 28, when rotation of the driven-gears, either 10A and 10B, or 10 and 10A are coincident with shafts 18. Accordingly, with two rotatable driver-gears incorporated in the generators as shown in FIGS. 14 and 24, kinematic-continuum through the drive-train requires only two inverted gear train-loops, and four loops are required when only one rotatable-driver-gear is incorporated in the generators.

Of further significance to the transmission layouts, FIGS. 14 and 24, with two rotatable-driver-gears incorporated in the generators the response function of the control-systems shown are self-generating. The response function, is defined as the kinetic forces required between the relatively-rotatable or linearly-movable element, and the fixed element of the control-system, that causes the rotatable-driver-gears to rotate relative to the relatively-fixed-driver-gear of the generators.

Figure 29:
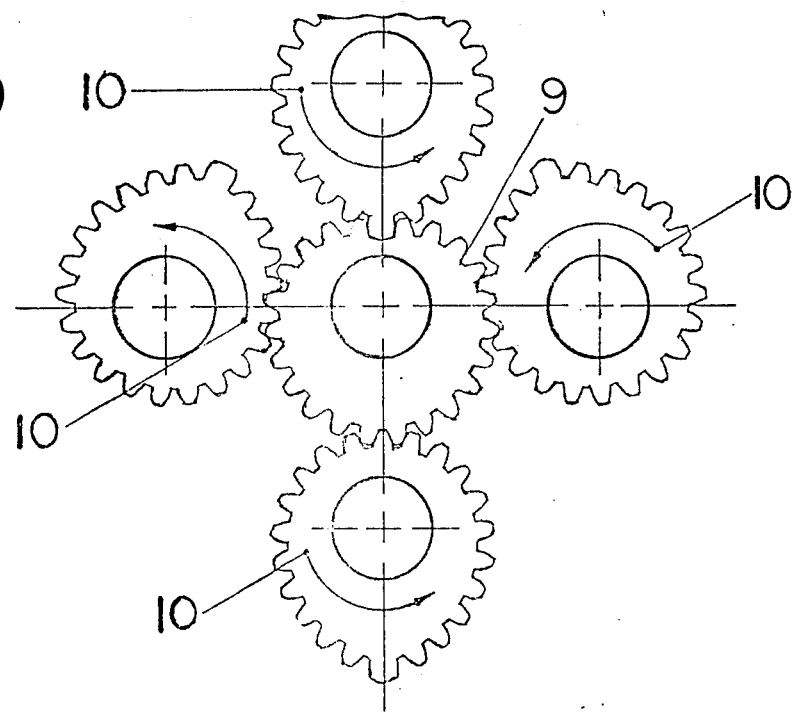
FIG. 29 shows a set of four driven-gears with a common driver-gear.

FIG. 29 shows the relative-radii of congruency for four variable-ratio-driven-gears evenly spaced around a common variable-ratio-driver-gear, as they would appear in the transmission of FIG. 14 and 24, as either of the rotatable-driver-gear banks. With constant torque on the individual driven-gears of the sets, the reactive-torque on the driver-gear caused by each driven-gear is proportional to the inverse ratio of the relative length of their radii of congruency. With any fixed-translation-ratio through the transmission of FIGS. 12 or 24, the conservative-torque-field of the transmission, i.e. the reactive torque, input torque and output torque, is defineable and remains constant. Therefore, the output torque on the driven-take-off-gear of transmission of FIG. 14, and the reactive torque on the driven-take-off-gear of transmission FIG. 24, is transferred to the driver-take-off-gears 4 at a constant ratio, with the resulting torque on the bevel-gears of the differential-gear-trains and attached shaft 18 subject to the number of active loops in the transmission. As shown in FIGS. 16, 17 and 27, 28, only one of the driven-gears 10A or 10B, and 10 or 10A of the respective transmission loops is coincident with shaft 18 when the loops are active, with coincidence occuring in sequence from the linear-sawtooth-veleocity-pattern of the driven-gear congruent to the rotatable-driver-gear with a positive relative-displacement, to, the driven-gear of the rotatable-driver-gear with negative relative-displacement from the relatively-fixed-driver-gear. Accordingly, the reactive torque on the driver-gear with a positive relative-displacement will cycle from a maximum to a minimum value, as congruency with each driven-gear of the sets occurs; with the reactive torque on the driver-gear with a negative relative-displacement, cycling from a minimum to a maximum value, as congruency with each driven-gear of the sets occurs, with these cyclical reactive-torque felt respectively on the control shafts 21 and 21A of the transmission layouts of FIGS. 14 and 24.

When this cyclical variation in reactive-torque is transferred from the control shafts 21 and 21A to the rotatable or linear-displaceable-element of the control-actuators, the resultant imbalance will cyclically impose a compressive force on the fluid trapped in chamber J and K.

Figure 30:
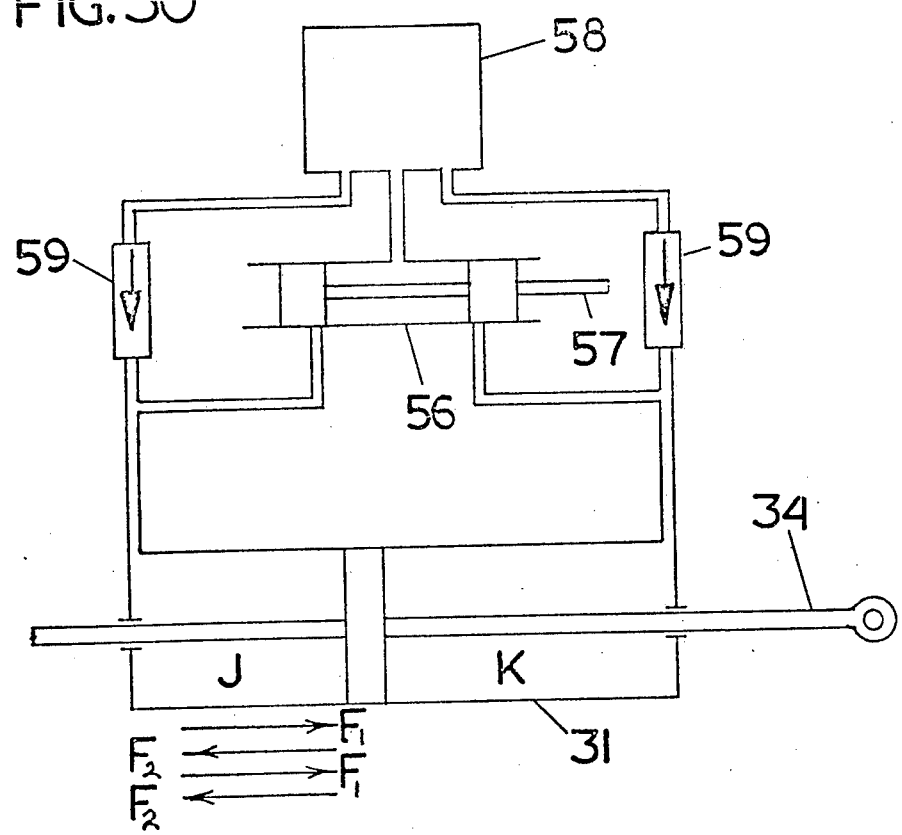
FIG. 30 shows a simple hydraulic-valve system.

With a simple hydraulic-valve-system as shown in FIG. 30 incorporated between the chambers of the control-actuator and a common reservoir, selective by-passing of the trapped fluid of either chamber to the reservoir, will provide the control-response-function, necessary to either decrease, or increase the relative-angle between the reference-radii of the rotatable-driver-gears and the reference-radius of the relatively-fixed-driver-gear.

With the actuator-body 31 subject to the cycling relative forces $F_1$, $F_2$, $F_1$, etc. with the piston-rod 34 held fixed, and with the control-spool 57 of the control-valve 56 as shown, the fluid of chambers J and K will remain trapped, and there will be no relative movement between the actuator body and the piston rod.

With selection of the spool-valve 57 so that the passage from chamber J to the reservoir 58 is open, with the passage from chamber K to the reservoir remaining closed, the trapped fluid in chamber J will escape coincident with the cylical application of force $F_1$, with the replacement fluid to chamber K by-passing the control spool through the one-way valve 59, with resultant movement of the actuator body, in the same sense as the applied force $F_1$. Conversely, if the spool 57 is selected to open the passage of fluid from chamber K to the reservoir, movement of the actuator-body will be in the same sense as the applied force $F_2$.

Since the hydraulic-actuators of FIGS. 14 and 24 are functionally comparable in respect to their relatively movable and fixed elements, both actuators will respond to the movement of the spool 57 with the simple hydraulic-valve-system in FIG. 30 incorporated.

The output velocity ratio, relative to the input velocity, of Center-spool Transmissions is expressed by equations (2) or (3); with equation (2) expressing the relative output velocity ratio of the Transmissions when the driven-take-off-gear is the output element and the variable-ratio-driver-gears is the reactive element, with equation (3) expressing the relative output velocity ratio of the Transmissions when the variable-ratio-driver-gears is the output element and the driven-take-off-gear is the reactive element, where $W_{out}$ and $W_{in}$ are respectively the output and input velocities, TOR is the take-off-gear ratio, and $\tau$ is the amplification characteristic of the specific square-wave generators incorporated in the invented-gear-train-loops of the Transmissions.

With specific square-wave generators incorporated in the Transmissions, the variation in the amplification characteristic of the generators $\tau$, is subject to the orientation of the overrunning clutches and the relative displacement of the rotatable variable-ratio-driver-gears(s). Accordingly, with a specific variation in the amplification characteristic of the generators $\tau$, the specific finite range of infinitely variable output velocity ratio will be subject to the take-off-gear-ratio of the Transmission, TOR.

In the following analysis of output dynamics of the Transmissions, equations (2) and (3) are used to express the relative range of infinitely variable output ratio that is obtained with a specific range of generator amplification $\tau$, and with different take-off-gear-ratios incorporated in the Transmission loops.

Equation (2), $\tau = 1$ to 1.5 TOR = 2, 1.5, 0.4, 1, or 1.25

$$\overline{W_{out}} = 1\left(1 - \frac{[\tau]_1^{1.5}}{2}\right) = +.5 \text{ to } +.25$$

$$\overline{W_{out}} = 1\left(1 - \frac{[\tau]_1^{1.5}}{1.5}\right) = +.333 \text{ to } 0$$

$$\overline{W_{out}} = 1\left(1 - \frac{[\tau]_1^{1.5}}{.4}\right) = -1.5 \text{ to } -2.75$$

$$\overline{W_{out}} = 1\left(1 - \frac{[\tau]_1^{1.5}}{1}\right) = 0 \text{ to } -.5$$

$$\overline{W_{out}} = 1\left(1 - \frac{[\tau]_1^{1.5}}{1.25}\right) = +.2 \text{ to } -.2$$

Equation (3), $\tau = 1$ to 0.5 TOR = 0.25, 0.5, 1.2, 1, or 0.666.

$$\overline{W_{out}} = 1\left(1 - \frac{.25}{[\tau]_{.5}^1}\right) = +.75 \text{ to } +.5$$

$$\overline{W_{out}} = 1\left(1 - \frac{.5}{[\tau]_{.5}^1}\right) = +.5 \text{ to } 0$$

$$\overline{W_{out}} = 1\left(1 - \frac{1.2}{[\tau]_{.5}^1}\right) = -.2 \text{ to } -1.4$$

$$\overline{W_{out}} = 1\left(1 - \frac{1}{[\tau]_{.5}^1}\right) = 0 \text{ to } -1$$

$$\overline{W_{out}} = 1\left(1 - \frac{.666}{[\tau]_{.5}^1}\right) = +.333 \text{ to } -.333$$

From this analysis it has been shown that the kinematic-ratio between the common first and last elements of the plurality of inverted-gear-train-loops, used reciprocally as either the output or reaction elements of the Transmissions, can be made to vary such that the output element of the Transmission will rotate in either direction, either with or without infinite translation; or in both directions with infinite translation; subject to the specific take-off-gear-ratio of the loops.

I claim:

1. An infinitely-variable-transmission consisting of a plurality of inverted gear-train-loops that share a common first and last gear-elements, with each said loop incorporating a square-wave-generator such that the said last gear-element is the common driven-take-off-gear of the loops with the said first gear-element the common variable-ratio-driver-gears of the said generators and the reactive-element of the transmission, with the differential-assemblies of the said generators mounted in a rotatable center-spool with their axes parallel to and evenly spaced around the common axis to the said common first and last elements, with the said last element of the loops attached to the output-shaft of the transmission with supporting-journals in the front disk of the said center-spool and a concentrically-mounted column variable-ratio-driver-gear of the said first element, with the said common driver-gear affixed to the stationary-transmission-housing; coaxially-mounted in the transmission with the output-shaft is the input-shaft to which is attached the center-disk of the said center-spool; concentrically mounted to the input-shaft, free to rotate, is a hollow control-shaft with supporting-journals in the rear disk of the said center-spool and the said stationary-transmission-housing; attached to the said control-shaft adjacent to the said center-disk is a second common variable-ratio-driver-gear of the said first element; attached to the outboard end of the said control-shaft is a control-arm with linkage to the body of a control-actuator; the piston-rod of the said control-actuator is attached to an extension of the said stationary-transmission-housing so that with movement of the said control-actuator-body on the said fixed-piston-rod, the reference-radius of the said driver-gear attached to the said control-shaft will rotate, through a limited arc, relative to the reference-radius of the said driver-gear attached to the said stationary-transmission-housing, thereby, changing the relative phase-angle in the linear-sawtooth rotational-patterns of their congruent variable-ratio-driven-gears attached to the said differential-assemblies, so that with constant rotation of the input-shaft and attached center-spool, the relative velocities of the said driven-gears are integrated by the differential-gear-trains of the said driven-gears are integrated by the differential-gear-trains of the said generators, within the limits imposed by the action of the overrunning-clutches and subject to the conservative-field-force, so that the kinematic-ratio between the common first and last elements of the said plurality of inverted-gear-train-loops can be made to vary infinitely, within a finite range that is subject to the controllable relative-angle between the reference-radii of the said driver-gears and the fixed-ratio of the take-off gears, with the finite range of kinematic-ratio such that the output-shaft of the transmission can be made to rotate in either direction, either with or without infinite translation; or in both directions with infinite translation.

2. An infinitely-variable-transmission consisting of a plurality of inverted gear-train-loops that share common first and last gear-elements, with each said loop incorporating a square-wave-generator such that the said first gear-element is the common take-off-gear of the said loops and the reactive-element of the transmission, with the said last gear-element the common variable-ratio-driver-gears of the said generators and the output-shaft of the transmission, with the differential-assemblies of the said generators mounted in a rotatable center-spool with their axes parallel to and evenly spaced around the common axis to the said common first and last elements, with the said first-element of the loops attached to a hollow shaft passing through and journaled in the front disk of the said center-spool and affixed to a stationary supporting-bracket; the said front disk of the said center-spool being in the form of an open-eyed cylinder such that the rear disk is flanged to the open end and held in position by through-bolts; the said rear-disk having an outside center-line-boss to which is attached the input-shaft of a prime-mover, and an inner center-line journal in which is fitted, and free to rotate, one end of the said output-shaft to the transmission; to one end of the said output-shaft adjacent to the center-line journal of the said rear disk is affixed a common variable-ratio-driver-gear of the said last gear-element, on the opposite end of the said output-shaft, forward of the said stationary supporting-bracket, is affixed the rotor of a rotary-control-actuator, concentrically-mounted and free to rotate on the said output-shaft, within the said stationary hollow-shaft and between the said rotor and driver-gear, is a control-shaft to which is affixed, adjacent to the said driver-gear, a second common variable-ratio-driver-gear of the said last gear-element; on the opposite end of the said control shaft, between the said stationary-bracket affixed to the said hollow-shaft and the said rotor affixed to the output-shaft, is affixed the rear flange of the control-actuator together with the actuator front-flange and cylindrical-housing; on the adjacent faces of the said stationary-bracket and said rear-flange of the control-actuator are annular grooves and seals that permit passage of fluid to the control-actuator-chambers, which selectively rotate the actuator body relative to the actuator rotor, so that the reference-radius of the said driver-gear attached to the said control-shaft will rotate, through a limited arc, relative to the relatively-fixed reference-radius of the said driver-gear attached to the said output shaft, thereby, changing the relative phase-angle in the linear-sawtooth rotational-patterns of their congruent variable-ratio-driven-gears attached to the said differential assemblies mounted in the said rotatable center-spool, so that with constant rotation of the prime mover and attached center-spool, the relative velocities of the said driven-gears are integrated by the differential-gear-trains of the said generators, within the limits imposed by the action of the overrunning-clutches, and subject to the conservative-field-forces, so that the kinematic ratio between the common first and last elements of the said plurality of inverted gear-train-loops can be made to vary infinitely, within a finite range that is subject to the controllable relative-angle between the reference-radii of the said driver-gears and the fixed-ratio of the take-off gears, with the finite range of kinematic ratio such that the output shaft of the transmission can be made to rotate in either direction, either with or without infinite transmission; or in both directions with infinite translation.

3. An infinitely-variable-transmission as defined in claim 1 with the differential-assembly of the square-wave-generator incorporated in each loop consisting of a differential-gear-train with the variable-ratio-driven-gears of the generator having the same linear-sawtooth rotational-pattern and attached directly to the bevel-gears of the differential-gear-train, with the driver-take-off-gear mounted to the differential-carrier by an overrunning clutch.

4. An infinitely-variable-transmission as defined in claim 2 with the differential-assembly of the square-wave-generator incorporated in each loop consisting of a differential-gear-train with the variable-ratio-driven-gears of the generator having the same linear-sawtooth rotational-pattern and attached directly to the bevel-gears of the differential-gear-train, with the driver-take-off-gear mounted to the dififerential-carrier by an over-running clutch.

5. An infinitely-variable-transmission as defined in claim 1, with the differential assembly of the square-wave-generator incorporated in each loop consisting of a differential-gear-train with the variable-ratio-driven-gears of the generator having the same linear-sawtooth rotational-pattern, with one of the said driven-gears affixed to one of the bevel-gears of the differential-gear-train, and the second said driven-gear mounted to the second bevel-gear by an overrunning clutch, with the driver-take-off gear affixed to the differential-carrier.

6. An infinitely-variable-transmission as defined in claim 2, with the differential assembly of the square-wave-generator incorporated in each loop consisting of a differential-gear-train with the variable-ratio-driven-gears of the generators having the same linear-sawtooth-rotational-pattern, with one of the said driven-gears affixed to one of the bevel-gears of the differential-gear-train, and the second said driven-gear mounted to the second bevel-gear by an overrunning-clutch, with the driver-take-off-gear affixed to the differential carrier.

7. An infinitely-variable-transmission as defined in claim 1, with the differential-assembly of the square-wave-generator incorporated in each loop such that the variable-ratio-driven-gears have the same linear-sawtooth-rotational-pattern, with one of the said driven-gears affixed to one of the bevel-gears of the differential-gear-train, and the second said driven-gear mounted to the second bevel-gear by an overrunning clutch, with the driver-take-off-gear affixed to the differential-carrier; the said control-actuator having a second linkage extending to a second control-arm affixed to a second hollow concentric-control-shaft extending through the transmission-housing and rear disk of the center-spool with a third common variable-ratio-driver-gear affixed so that the congruent driven-gear is mounted to the second bevel-gear of the differential-gear-train by an overrunning-clutch; the said second control-arm being so mounted to the said second hollow control-shaft that the relative rotational-displacement of the reference-radius of the said affixed driver-gear is opposite to that of the reference-radius of the said driver-gear affixed to the said first control-shaft, with movement of the said actuator-body on the said piston-rod.

8. An infinitely-variable-transmission as defined in claim 1, with the differential-assembly of the square-wave-generator incorporated in each loop consisting of a differential-gear-train with the variable-ratio-driven-gear affixed to the differential-carrier having half the acceleration in linear-sawtooth-rotational-pattern as the variable-ratio-driven-gear affixed to one of the bevel-gears of the differential-gear-train, with the driver-take-off-gear mounted to the second bevel-gear by an overrunning-clutch.

9. An infinitely-variable-transmission as defined in claim 2, with the differential-assembly of the square-wave-generator incorporated in each loop consisting of a differential-gear-train with the variable-ratio-driven-gear affixed to the differential-carrier having half of the acceleration in linear-sawtooth-rotational-pattern as the variable-ratio-driven-gear affixed to one of the bevel-gears of the differential-gear-train, with the driver-take-off-gear mounted to the second bevel-gear by an overrunning-clutch.

10. An infinitely-variable-transmission as defined in claim 1, with the differential-assembly of the square-wave-generator incorporated in each loop consisting of a differential-gear-train with the variable-ratio-driven-gear affixed to the differential-carrier having half the acceleration in linear-sawtooth-rotational-pattern as the variable-ratio-driven-gear mounted to one of the bevel-gears of the differential-gear-train by an overrunning-clutch, with the driver-take-off-gear affixed to the second bevel-gear.

11. An infinitely-variable-transmission as defined in claim 2, with the differential-assembly of the square-wave-generator incorporated in each loop consisting of a differential-gear-train with the variable-ratio-driven-gear affixed to the differential-carrier having half the acceleration in linear-sawtooth-rotational-pattern as the variable-ratio-driven-gear mounted to one of the bevel-gears of the differential-gear-train by an overrunning-clutch, with the driver-take-off-gear affixed to the second bevel-gear.

12. An infinitely-variable-transmission as defined in claim 1, with the differential-assembly of the square-wave-generator incorporated in each loop consisting of a differential-gear-train with the variable-ratio-driven-gear affixed to the differential-carrier having half the acceleration in linear-sawtooth-rotational-pattern as the variable-ratio-driven-gear mounted to one of the bevel-gears of the differential by an overrunning-clutch, with the driver-take-off-gear affixed to the second bevel-gear; with the said control actuator having a second linkage extending to a second control-arm affixed to a second hollow concentric control-shaft extending through the transmission-housing and rear disk of the center-spool with a third common variable-ratio driver-gear affixed with congruent driven-gear having the same linear-sawtooth-rotational-pattern and mounted to the same bevel-gear of the differential-gear-train by an overrunning-clutch, as the said driven-gear congruent to the affixed driver-gear of the said first control-shaft, with the said second control-arm being so mounted to the said second hollow control-shaft that the relative rotational-displacement of the reference-radius of the said attached driver-gear is opposite to that of the reference-radius of the said driver-gear affixed to the said first control-shaft, with movement of the said actuator-body on the said piston-rod.

13. An infinitely-variable-transmission as defined in claim 2, with the differential-assembly of the square-wave-generator incorporated in each loop consisting of a differential-gear-train with the variable-ratio driven-gears having the same linear-sawtooth-rotational-pattern, with one said driven-gear affixed to one of the bevel-gears of the differential-gear-train and the second said driven-gear mounted to the second bevel-gear by an overrunning-clutch, with the driver-take-off gear affixed to the differential-carrier; with the said rotor of the said rotary-control-actuator incorporating a control-differential-gear-train with the said actuator-rotor being the carrier, to which is mounted the differential-gear-train-pinion, with one of the bevel-gears affixed to the said front-flange and cylindrical-housing of the said rotary-control-actuator, and the second bevel gear affixed to a second control-shaft concentrically-mounted and free to rotate on the said first control-shaft within the said stationary hollow-shaft; affixed to the said second control-shaft adjacent to the said second variable-train-driver-gear is a third variable-ratio-driver-gear with congruent-driven-gear mounted to the said second bevel-gear of the generator-differential-gear-train by an overrunning-clutch together with the second driven-gear; subject to the restraints of the said control-differential-gear-train, the reference-radius of the said third driver-gear will rotate in the opposite sense than the said reference-radius of the said second driver-gear, as the control-actuator-body is made to rotate around the said rotor and relative to the relatively-fixed reference radius of the first driver gear.

14. An infinitely-variable-transmission as defined in claim 2, with the differential-assembly of the square-wave-generator incorporated in each loop consisting of a differential-gear-train with the variable-ratio-driven-gear affixed to the differential-carrier having half the acceleration in linear-sawtooth-rotational-pattern as the variable-ratio-driven-gear mounted to one of the bevel-gears of the differential by an overrunning clutch, with the driver-take-off-gear affixed to the second bevel-gear of the differential; with the congruent variable-ratio-driven-gear, to the said driven-gear affixed to the carrier of the differential, affixed to the said output shaft of the transmission; and the congruent variable-ratio-driver-gear to the said driven-gear mounted to the bevel-gear of the differential with an overrunning-clutch, affixed to the said controlshaft; and with the said rotor of the said rotary-control-actuator incorporating a control-differential-gear-train with the said rotor being the carrier, to which is mounted the differential-gear-train-pinion, with one of the bevel-gears affixed to the said front-flange and cylindrical-housing of the said control-actuator, and the second bevel-gear affixed to a second control-shaft concentrically-mounted and free to rotate on the said first control-shaft within the said stationary hollow-shaft; affixed to the said second control-shaft adjacent to the said second variable-ratio-driver-gear is a third variable-ratio-driver-gear with the congruent-driven-gear mounted to the second bevel-gear of the generator-differential-gear-train by an over-running-clutch, together with the said second driven-gear; subject to the restraint of the control-differential-gear-train, the reference-radius of the said third driver-gear will rotate in the opposite sense than the said reference-radius of the second driver-gear, as the control-actuator-body is made to rotate around the said rotor and relative to the relatively-fixed reference-radius of the first driver-gear.

15. An infinitely-variable-transmission- as defined in claim 7, with a simple-hydraulic-valve-system incorporated between the two chambers of the said linear-hydraulic-control-actuator that consists of a bi-directionally-movable-spool-control-valve with a return passage to a common reservoir of the said system, with each said direction of the first driver gear passage that permits fluid to flow from one of the said two chambers of the control actuator to the said common reservoir, with the said passages between the said chambers and the said spool-control-valve incorporating a second passage to the said reservoir with a one-way-valve so orientated that fluid is restricted to a flow from the said reservoir to the said chamber of the said control-actuator, so that with specific movement of the said spool, fluid will flow from the chamber of the said control-actuator through the said spool-valve to the said reservoir and from the said reservoir through the opposite one-way-valve to the opposite chamber of the said control-actuator in response to the direction of force applied to the actuator body of the said control-actuator, caused by the differential relative torque applied to the rotatable-variable-ratio-driver-gears of the said generators during rotation of the said center-spool, thereby, providing the control-response-function of the control system incorporated in the transmission.

16. An infinitely-variable-transmission- as defined in claim 12, with a simple-hydraulic-valve-system incorporated between the two chambers of the said linear-hydraulic-control-actuator that consists of a bi-directionally-movable-spool-control-valve with a return passage to a common reservoir of the said system, with each said direction of movement of the spool opening a passage that permits fluid to flow from one of the said two chambers of the control actuator to the said common reservoir, with the said passages between the said chambers and the said spool-control-valve incorporating a second passage to the said reservoir and a one-way-valve so oriented that fluid is restricted to a flow from the said reservoir to the said chamber of the said control-actuator, so that with specific movement of the said spool, fluid will flow from the chamber of the said control-actuator through the said spool-valve to the said reservoir and from the said reservoir through the opposite one-way-valve to the opposite chamber of the said control-actuator in response to the direction of force applied to the actuator body of the said control-actuator, caused by the different relative torque applied to the rotatable-variable-ratio-driver-gears of the said generators during rotation of the said center-spool, thereby, providing the control-response-function of the control system incorporated in the transmission.

17. An infinitely-variable-transmission as defined in claim 13, with a simple-hydraulic-valve-system incorporated between the two functional chambers of the said rotary-hydraulic-control-actuator that consists of a bi-directionally-movable-spool-control-valve with a return passage to a common reservoir of the said system, with each said direction of movement of the spool opening a passage that permits fluid to flow from one of the said two functional chambers of the control-actuator to the said common reservoir, with the said passage between the said chambers and the said spool-control-valve incorporating a second passage to the said reservoir with a one-way valve so oriented that fluid is restricted to a flow from the said reservoir to the said chambers the said control-actuator, so that with specific movement of the said spool, fluid will flow from the chamber of the said control-actuator through the said spool-valve to the said reservoir and from the said reservoir through the opposite one-way valve to the opposite chamber of the said control-actuator in response to the direction of force applied to the actuator body of the said control-actuator, caused by the different relative torque applied to the rotatable-variable-ratio-driver-gears of the generators during rotation of the said center-spool, thereby, providing the control-response-function of the control system incorporated in the transmission.

18. An infinitely-variable-transmission as defined in claim 14, with a simple-hydraulic-valve-system incorporated between the two functional chambers of the said rotary-hydraulic-control-actuator that consists of a bi-directionally-movable-spool-control-valve with a return passage to a common reservoir of the said system, with each said direction of movement of the spool opening a passage that permits fluid to flow from one of the said two functional chambers of the control-actuator to the said common reservoir, with the said passages between the said chambers and the said spool-control-valve incorporating a second passage to the said reservoir with a one-way-valve so orientated that fluid is restricted to a flow from the said reservoir to the said chambers of the said control-actuator, so that with specific movement of the said spool, fluid will flow from the chamber of the said control-actuator through the said spool-valve to the said reservoir and from the said reservoir through the opposite one-way-valve to the opposite chamber of the said control-actuator in response to the direction of force applied to the actuator body of the said control-actuator, caused by the different relative torque applied to the rotatable-variable-ratio-driver-gears of the said generators during rotation of the said center-spool, thereby, providing the control-response-function of the control system incorporated in the transmission.

19. An infinitely variable transmission comprising
an input shaft and a coaxial output shaft;
at least two relatively rotatable variable profile driver gears mounted to said input shaft;
control means for altering the relative rotational positioning of said driver gears;
at least one constant profile driven take-off gear mounted to said output shaft;

at least one center spool fixed to said input shaft; and
a plurality of inverted gear train loops arranged about the axis of said input and output shafts;
each loop including a square wave generator having relatively rotatable variable profile driven gears meshing with said driver gears, a differential assembly mounted in said center-spool, and a constant profile driver take-off gear meshing with said driven take-off gear, the rotation of said driver take-off gear being controlled by said differential assembly through an overrunning clutch;
whereby for a given input and subject to the relative rotational positioning of said variable profile driver gears and a fixed ratio of said take-off gears, the output shaft can be made to rotate in either direction, either with or without infinite translation or can be made to rotate in both directions with infinite translation.

* * * * *